(12) United States Patent
Rabnawaz et al.

(10) Patent No.: US 11,814,540 B2
(45) Date of Patent: Nov. 14, 2023

(54) BIODEGRADABLE OMNIPHOBIC AND HIGH-BARRIER COATINGS, RELATED ARTICLES, AND RELATED METHODS

(71) Applicant: BOARD OF TRUSTEES OF MICHIGAN STATE UNIVERSITY, East Lansing, MI (US)

(72) Inventors: Muhammad Rabnawaz, East Lansing, MI (US); Syeda Shamila Hamdani, Garhi Dupatta (PK)

(73) Assignee: BOARD OF TRUSTEES OF MICHIGAN STATE UNIVERSITY, East Lansing, MI (US)

(*) Notice: Subject to any disclaimer, the term of this patent is extended or adjusted under 35 U.S.C. 154(b) by 0 days.

(21) Appl. No.: 17/054,626

(22) PCT Filed: Jun. 2, 2020

(86) PCT No.: PCT/US2020/035671
§ 371 (c)(1),
(2) Date: Nov. 11, 2020

(87) PCT Pub. No.: WO2020/247355
PCT Pub. Date: Dec. 10, 2020

(65) Prior Publication Data
US 2021/0246333 A1 Aug. 12, 2021

Related U.S. Application Data

(60) Provisional application No. 62/856,597, filed on Jun. 3, 2019.

(51) Int. Cl.
*C09D 189/00* (2006.01)
*C09D 103/02* (2006.01)
(Continued)

(52) U.S. Cl.
CPC ......... *C09D 189/00* (2013.01); *C09D 103/02* (2013.01); *C09D 105/08* (2013.01); *C09D 129/04* (2013.01)

(58) Field of Classification Search
CPC ........ B32B 2317/12; B32B 29/00; B32B 7/02
See application file for complete search history.

(56) References Cited

U.S. PATENT DOCUMENTS 5,219,926 A * 6/1993 Lindman ............. A61L 33/0029
435/177
9,200,409 B2 * 12/2015 Hartmann ............. D21H 19/82
(Continued)

FOREIGN PATENT DOCUMENTS

JP       2001180763 A  *  7/2001
WO    WO-2014/149465        9/2014
(Continued)

OTHER PUBLICATIONS

Machine translation of JP-2001180763-A (Year: 2021).*
(Continued)

*Primary Examiner* — Liam J Heincer
(74) *Attorney, Agent, or Firm* — MARSHALL, GERSTEIN & BORUN LLP

(57) ABSTRACT

The disclosure relates to omniphobic coatings, related articles including such coatings, and related method for forming such coatings or articles, for example biobased and/or biodegradable omniphobic coatings with high barrier properties. The omniphobic coating includes an oleophobic and hydrophilic first layer, and a hydrophobic and optionally oleophilic second layer adjacent to the first layer. A corresponding omniphobic coated article can include the omniphobic coating on a substrate such as a porous cellulosic or paper substrate, for example to provide a water- and oil/fat/grease-resistant coating for a paper-based product. The first layer of the omniphobic coating is adjacent to the substrate
(Continued)

and the second layer is adjacent to the first layer at a position further from the substrate than the first layer. The omniphobic coating can be applied to a substrate in a layer-by-layer process, and the coated article can be recycled by extraction to remove the coating and recover the substrate material, for example in a re-pulping process.

30 Claims, 3 Drawing Sheets

(51) Int. Cl.
*C09D 105/08* (2006.01)
*C09D 129/04* (2006.01)

(56) References Cited

U.S. PATENT DOCUMENTS

| | | | |
|---|---|---|---|
| 10,596,790 B1* | 3/2020 | Chen | B32B 27/32 |
| 2002/0094444 A1* | 7/2002 | Nakata | C05G 5/40 |
| | | | 428/480 |
| 2002/0155260 A1* | 10/2002 | Chen | B41M 5/52 |
| | | | 428/32.36 |
| 2007/0292643 A1* | 12/2007 | Renn | B65D 25/34 |
| | | | 428/35.7 |
| 2010/0047323 A1* | 2/2010 | Ito | A61K 47/10 |
| | | | 424/443 |
| 2010/0316806 A1 | 12/2010 | He et al. | |
| 2011/0206914 A1* | 8/2011 | Hartmann | D21H 19/82 |
| | | | 428/212 |
| 2012/0027837 A1* | 2/2012 | DeMuth | C12N 5/0068 |
| | | | 424/443 |
| 2012/0270032 A1* | 10/2012 | Nasser | D21H 19/38 |
| | | | 428/313.3 |
| 2013/0176371 A1* | 7/2013 | Nagoshi | B41J 2/01 |
| | | | 347/106 |
| 2013/0287836 A1* | 10/2013 | Ingber | A61L 27/48 |
| | | | 424/443 |
| 2015/0232506 A1* | 8/2015 | Ashitaka | C07K 1/34 |
| | | | 210/504 |
| 2016/0200937 A1 | 7/2016 | Hu et al. | |
| 2016/0362562 A1* | 12/2016 | Zhang | B05D 5/083 |
| 2017/0065974 A1* | 3/2017 | Bollstrom | C09D 125/14 |
| 2020/0047084 A1* | 2/2020 | Kawaguchi | B01J 20/3293 |

FOREIGN PATENT DOCUMENTS

| | | |
|---|---|---|
| WO | WO-2017/220591 A1 | 12/2017 |
| WO | WO-2019/099608 A1 | 5/2019 |

OTHER PUBLICATIONS

Zhang et al. (Carbohydrate Polymers 101 2014, 401-406) (Year: 2014).*
Parris et al. (J. Agric. Food Chem. 2000, 48, 890-894) (Year: 2000).*
Despond et al. (Journal of Applied Polymer Science, vol. 98, 704-710, 2005). (Year: 2005).*
International Application No. PCT/US2020/035671, International Search Report and Written Opinion, dated Sep. 14, 2020.

* cited by examiner

BIODEGRADABLE OMNIPHOBIC AND HIGH-BARRIER COATINGS, RELATED ARTICLES, AND RELATED METHODS

CROSS-REFERENCE TO RELATED APPLICATIONS

This is a National Stage of International Application No. PCT/US2020/035671, filed Jun. 2, 2020, which claims the benefit of U.S. Provisional Application No. 62/856,597, filed Jun. 3, 2019, which are incorporated herein by reference in their entireties.

STATEMENT OF GOVERNMENT INTEREST

None.

BACKGROUND OF THE DISCLOSURE

Field of the Disclosure

The disclosure relates to omniphobic coatings, related articles including such coatings, and related methods for forming such coatings or articles, for example biobased and/or biodegradable omniphobic coatings, in particular with high barrier properties. The omniphobic coating includes an oleophobic and hydrophilic first layer, and a hydrophobic and optionally oleophilic second layer adjacent to the first layer. A corresponding omniphobic coated article can include the omniphobic coating on a substrate such as a porous cellulosic or paper substrate.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2. The use of a rough surface with nano-wells such as in FIG. 2 prevents water droplets from entering etched grooves. However, under a high enough pressure, the water will still disperse into the wells and such coatings are expensive and difficult to manufacture. Another method (not shown) utilizes a sponge coating that is doped with a hydrophobic material to prevent water dispersion. The sponge method works well at repelling water, but is not a durable material and will eventually degrade. Both of the previous methods generally either lack the feature of optical transparency or require costly additional steps and/or components to provide optical transparency. Optical transparency is key for the coating to allow for coated materials to still be visible.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

In recent years, there have been significant efforts to reduce or eliminate the amount of plastic that the general public utilizes, in particular for disposable food-service items. For example, announcements and pledges to cease the use of plastic straws, plates, and cutlery are prevalent; however, there is often little thought as to solutions for replacements. In some cases, replacements might not themselves be environmentally friendly (e.g., non-biodegradable), or require further expensive processing to become environmentally friendly. Paper coated with biodegradable polymers may offer a solution; however, many coatings contain fluorine which have environmental and personal health hazards. Others may be repellent to water, but perform poorly for oil repellency. Natural coatings, such as wax paper, are biodegradable, sustainable, and safe for food packaging purposes; however, they suffer from poor mechanical durability, poor thermal resistance, and will also easily break from the paper. Also, wax-coated paper is difficult to recycle as it forms sticky, difficult-to-process masses in the recycled pulp.

Paper products are widely used materials in the packaging, labelling, and printing industry due to their relatively low cost, renewable feedstocks and biodegradable nature. Despite these advantages, paper and paper-based materials have limited use to their poor water resistance and grease/oil resistance. To improve water resistance, various approaches have been applied including paper sizing, physico-chemical modification (plasma etching, etc.), chemical modification (e.g., grafting approach, layer-by-layer, etc.). However, most of these techniques are not useful for practical large-scale production for one or more reasons including time-consuming processes, the use of costly raw materials, and reliance on environmentally harmful chemicals. Also, in these cases, the separation of the pulp from the fabricated paper is challenging.

Lamination and waxing of paper are common industrial approaches for water and oil-resistant paper fabrications. For example, LDPE is used as liner for disposable cups and plates that prevents the direct contact between a food/beverages and the paper. Waxed paper is used for meat and other food packing applications, however, wax has poor crack- and thermal-resistance, thus is limited to certain applications. A key challenge with the use of laminated- and waxed-paper is the paper recyclability after use. Consequently, these laminated and waxed papers become municipal solid waste (MSW).

As an alternative to LDPE, polylactic acid (PLA) is also used as an liner for paper cups and plates. However, PLA and paper cellulose biogrede in different environments because PLA is compostable in an industrial set up at a temperature of 60° C. Also, polyaleuritates, which are biodegradable polymers, have been applied onto cellulose by melt-processing, and subsequent addition of carnauba wax to improve the water and oxygen barrier properties. However, in both cases, the coated substrates were not oil resistant. Although the use of biodegradable plastic for paper lamination is helpful to reduce environmental footprint, it does not address the sustainable closed loop circular economy approach because paper is not recycled.

Some commercially available coated paper substrates are free from harmful fluorochemicals or waxes, but instead it relies on the use of synthetic non-degradable styrene-butadiene latex. These water-borne latex coated paper have polar groups, which make them less effective against water-borne products for relatively longer duration. Also, the use of latex has migration concerns from coated paper into the product. Monomers can also be trapped in latex that can create health concerns. The separation of latex from the paper will lead to the disposal of latex into the environment that may have adverse effects on animals. Microplastics pollution is one of the concerns when such latex enters water streams.

Fluorinated polymers are used to render paper strong water- and oil-resistant desirable for applications such as disposable plates and fast food wrappers. Although fluorochemicals render excellent water resistance due to their low surface energies, their cost, toxicity, and environmental concerns have created push to phase out fluorine from paper coatings. Alternatively, polysiloxanes, particularly polydimethyl siloxane (PDMS), have attracted great attention due to their affordable cost and environmental friendliness. PDMS has a lower surface energy (e.g., 20 mN/m) than other fluorine-free polymers (e.g., 31.6 mN/m for polyethylene), but still higher than perfluoroalkyls (e.g., 6.5 mN/m). As a result, PDMS coated paper is water resistant, while oil permeates into the pores of the paper because the surface energy of PDMS is not sufficiently low to stop oil migration/diffusion into the porous paper.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to an omniphobic coated article, comprising: a substrate (e.g., porous and/or cellulosic substrate); an omniphobic coating adjacent to the substrate, the omniphobic coating comprising: an oleophobic and hydrophilic first layer (e.g., chitosan, polyvinyl alcohol (PVOH)) adjacent to the substrate, and a hydrophobic and optionally oleophilic second layer (e.g., zein) adjacent to the first layer at a position further from the substrate than the first layer. The omniphobic coating as a whole can be directly or indirectly on or adhered to the substrate, such as with or without an intervening layer to improve adhesion or other function. The first and second layers can be adhered to each other through physical interactions and/or chemical interactions. The materials for first and second layers are preferably biodegradable, thus a corresponding free-standing film or the coated article can also be biodegradable, for example when the substrate is a biodegradable material such as paper or other cellulosic substrate. The omniphobic coating and corresponding article are suitably microwaveable (e.g., due to the high thermal stability of the coating ingredients) and/or sealable (e.g., thermally sealable in the presence of moisture/plasticizer, such as on a semi-dried coated paper or other substrate).

The first layer can be directly or indirectly on or adhered to the substrate, such as with or without an intervening layer to improve adhesion or other function. The first layer is generally oil-repellent/oleophobic and hydrophilic, for example being water-absorbent (but water-insoluble e.g. chitosan) or water-soluble (e.g. PVOH). The first layer and the underlying substrate are protected from water absorption and/or water dissolution by the overlying second layer. The first layer is closer to the substrate than the second layer. The first and second layers may be distinctly separate layers with little intermingling at the interface or partially diffused into each other at the interface. For example, the first and second layers can be distinctly separate layers due to poor or very limited interfacial diffusion of the two layers into each other. In certain cases, both layers will have significantly high interfacial diffusion into each other, for example when the second layer is applied on a semi-dry first layer.

The second layer can be directly or indirectly on or adhered to the first layer, such as with or without an intervening layer to improve adhesion or other function. The second layer is generally water-repellent/hydrophobic and can be oleophilic, for example being oil-absorbent (but oil-insoluble). In certain cases, the second layer can be slightly oil-repellent also, but does not provide sufficient overall oil resistance in the absence of the first layer, and the oil can permeate into the paper or other substrate in the absence of the first layer. The second layer is farther from the substrate than the first layer.

In a general laminate-type structure, the omniphobic coated article can have a substrate-first layer-second layer structure, with the second layer generally being closer to or exposed to the external environment at its surface opposite the first layer. Suitably, there are no further layers on the second layer, and the second layer is exposed to the external environment. The substrate surface opposite the first layer can be exposed to the external environment, can be not exposed to the external environment (e.g., part of an internal article structure), or can have another layer or coating thereon (e.g., another omniphobic coating with first and second layers).

Various refinements of the disclosed methods and coated articles are possible.

In a refinement, the first layer comprises a hydroxy-functional polymer comprising a plurality of (free) hydroxy groups. Free hydroxy groups such as in chitosan (fully and partially hydrolyzed), PVOH (fully and partially hydrolyzed), starch (unmodified and partially modified), casein and casein salts, and alginates can promote compatibility/adhesion to a cellulosic substrate and contribute to the oleophobic and hydrophilic character of the first layer. The first layer can also provide a strong gas barrier (e.g., oxygen barrier), in particular at low relative humidity, for example when the first layer includes PVOH and/or chitosan.

In a refinement, the first layer comprises an amino-functional polymer comprising a plurality of (free) amino groups. Free amino groups such as in chitosan can promote compatibility/adhesion to an amide-containing second layer (e.g., zein, other protein, or other water-insoluble biodegradable polymers) and contribute to the oleophobic and hydrophilic character of the first layer. Some or all of the amino groups can be in their corresponding ammonium form, for example as a result of being solubilized under acidic conditions in an aqueous solution for application to the substrate. Amino and hydroxy groups can be in the same polymer, such that the hydroxy-functional polymer and the amino-functional polymer are the same polymer (e.g., as in chitosan). Alternatively, the amino and hydroxy groups can be in the different polymers blended together in the first layer.

In a refinement, the first layer comprises an acetate-functional polymer comprising a plurality of acetate groups and/or amide groups. The acetate groups can be in the form of pendant ester groups, such as in polyvinylacetate. The acetate groups can be combined with hydroxy groups (e.g., in partially hydrolyzed PVOH or otherwise) and/or amino groups. The acetate groups can improve adhesion between the first and second layers.

In a refinement, the first layer can be made of a layer-by-layer combination of oppositely charge polymers such as PEI and polyacrylic acid (PAA) to render strong gas barrier properties, for example as a single bilayer or as multiple layers of each polymer. As a stand-alone first layer, the strong gas barrier properties can be degraded at high relative humidity due to water absorption. When coated with second layer materials according to the disclosure, however, the overall gas barrier properties of the omniphobic coating can be retained even at high relative humidity. Such system can work on application to porous substrates (e.g., paper) or can be used for free-standing films. For example, free standing films made of zein/(PEI-PAA)/zein, where PEI-PAA may be a single bilayer, or a multilayer film by itself. In the case of a coating on paper or other substrate, PEI-PAA layer(s) would be applied on the substrate as the first layer and then coated with zein or other second layer material.

In a refinement, the first layer comprises at least one oleophobic and hydrophilic polymer. The first layer can include a synthetic polymer ((e.g. poly(1-vinyl-2-pyrrolidinone), poly(N-isopropylacrylamide), polyethylene glycol), PVOH, polyethylene imine (PEI)), a polysaccharide (e.g., chitosan, alginates, starch), a water-soluble protein (e.g., caseins and caseinates, soy protein).

In a refinement, the first layer comprises chitosan.

In a refinement, first layer comprises chitosan as an amino-functional polymer and a hydroxy-functional polymer. The amino-functional polymer in general or chitosan in particular can include amino groups (e.g., and substantially no ammonium groups such as when neutralized or not in cationic form). The amino-functional polymer or chitosan in particular can include ammonium groups (e.g., and substantially no amino groups such as when acidified or in cationic form). The amino-functional polymer or chitosan in particular can include at least some amino groups and at least some ammonium groups (e.g., when partially neutralized/acidified and in partially cationic form). The amino-functional polymer or chitosan in particular can have a molecular weight in a range from 1000 to 500,000 g/mol. The degree of deacetylation of the amine in the chitosan suitably is in the range of 5% to 100%, such as between 85% and 100%. The amino-functional polymer or chitosan can be used alone or in combination as a mixture (in different weight percent ranges such as between 5% and 99% amino-functional polymer or chitosan) with other hydrophilic polymers, such as polyvinyl alcohol (PVOH), sodium alginate, starch, water-soluble proteins, and/or polyethylene imine (PEI, such as linear or branched PEI). The hydrophilic polymers may carry amino groups (e.g., $NH_2$ or NH groups such as in PEI) or hydroxy groups (e.g., OH groups such as in polyvinyl alcohol and starch), or acetate groups (partially hydrolyzed PVOH) and/or carboxylic groups (e.g., ionic COOH groups such as in sodium alginate). The amino-functional polymer can include PEI (e.g., alone or in combination with another amino-functional polymers such as chitosan), which optionally can be blended with non-amino hydrophilic polymers such as PVOH, starch, and sodium alginate. In some embodiments, the omniphobic coating is free from non-amino hydrophilic polymers. In some embodiments, the omniphobic coating is free from amino hydrophilic polymers, for example including a hydroxy-functional polymer such as starch or PVOH. In some embodiments, the omniphobic coating is free from hydrophilic segments other than the amino-functional polymer and/or hydroxy-functional polymer, for example being free from grafted hydrophilic segments (e.g., poly(1-vinyl-2-pyrrolidinone), polyether or polyalkylene oxide segments).

In a refinement, the first layer comprises a crosslinked polymer.

In a refinement, the second layer comprises a hydrophobic protein (e.g., a water-insoluble/water-repellent protein). The protein in any of its various embodiments (e.g., plant proteins or otherwise) includes amide linking groups between amino acid residues, which amide groups can promote compatibility/adhesion to an amino-containing first layer (e.g., chitosan) and contribute to the hydrophobic and oleophilic character of the second layer.

In a refinement, the second layer comprises a plant protein, for example a modified or unmodified plant protein. More generally, the second (top) layer materials can be obtained from nature and used as such or after chemical modification. For example, zein can be used as such or modified further to increase water resistance. Similarly, non-protein polymers such as starch once acetylated can be used as the second layer.

In a particular refinement, the plant protein is derived from one or more of wheat (gliadin, gluten), barley (hordein, gluten), rye (secalin, gluten), corn (zein), sorghum (kafirin), and oats (avenin, gluten). More generally, the plant protein can be water-insoluble or partially water-insoluble protein fractions (e.g., ethanol- or polar solvent-soluble/extractable).

In a particular refinement, the plant protein is selected from the group consisting of gliadin, hordein, secalin, zein, kafirin, avenin, and combinations thereof.

In a particular refinement, the plant protein comprises gluten. The second (top) layer can be blend of more than one protein, a blend of protein and non-protein, a chemically modified protein, and/or a protein coated with an additional top layer.

In a particular refinement, the plant protein comprises zein. In a more particular refinement, the zein is present in the omniphobic coating in an amount in range from 2 wt. % to 10 wt. % or 5 wt. % to 10 wt. % relative to the substrate. Suitable plant proteins more generally can include prolamins, plant storage proteins having a high proline and/or glutamine amino acid content. Such proteins have poor water solubility. The suitable protein are those soluble in mixture of water and ethanol or water and methanol but not in water alone. Gluten can include a combination of prolamins and glutelins, for example glutenin (e.g., derived from wheat). Some proteins such as whey protein which are water soluble are also suitable as second layer because after casting they undergo crosslinking and the end coating is water insoluble. Corn zein is one of the suitable proteins for these coatings. Proteins with relatively high fraction of non-polar functionalities are suitable candidates to be used as a second layer. For example, zein includes about 57% non-polar amino acids and 43% polar amino acids. Non-protein biodegradable polymers such as hydrophobic starch (acetylated starch), biodegradable polymers (PHAs, PLA), for example, additionally can be used in the second layer.

In a refinement, the second layer comprises a water-insoluble, non-protein (but dispersible) material. Examples of such materials include biodegradable materials (e.g., acetylated starch, PHAs), compostable materials (e.g., PLA), or non-biodegradable materials (e.g., alkyl ketene dimer (AKD), polystyrene latex, acrylic emulsion).

In a refinement, the second layer comprises a crosslinked polymer.

In a refinement, the first layer and the second layer are free from omniphobic polymers. More generally, the first and/or second layer can be used in the unmodified form, or can be further treated to enhance/modify certain properties. For example, to increase the release properties, one can add low surface energy materials. Sometimes the top layer can be made of polymer modified with vegetable oil to reinforce the water resistance of the top layer. For example, starch if hydrophobized with plant oil, can be used as top layer. Alternatively or additionally, either or both of the first and second layers do not include or are otherwise free from omniphobic polymers, for example as blends with the other layer materials and/or as reaction products/copolymers (e.g., graft, block, random, or other copolymer) with the other layer materials. Examples of such omniphobic polymers include polysiloxanes, polyperfluoroethers, polybutadienes, polyisobutenes, branched polyolefins, poly(meth)acrylates, polyesters (e.g., low-Tg polyesters such as low molecular weight poly(lactic acid), poly(hydroxyalkanoates)), vegetable oils, and functionalized derivatives thereof. Such functionalized derivatives include the foregoing omniphobic polymers with a further reactive functional group (e.g., isocyanate, epoxide, carboxylic acid) that could otherwise react with a functional group in the first or second layers (e.g., amino, hydroxy), and their corresponding reaction products.

In a refinement, materials forming the first layer and materials forming the second layer would form an incompatible (e.g., heterogeneous) mixture if blended together. Materials suitable for the first and second layers as separate generally tend to form incompatible or inhomogeneous mixtures in the absence of a compatibilizers promoting physical compatibility between the components and/or reacting/covalently linking the components. Such an inhomogeneous mixture would result in the heterogeneous dispersed phase not providing its respective barrier function (e.g., water- or oil-repellency, gas barriers) across substantially the entire coating surface. In addition to the water- and oil-repellency properties, the omniphobic coating also provides a barrier to gases, water vapor, aromas, etc. In general, a hydrophilic polymer (e.g., in the first layer) provides a strong oxygen barrier, and a hydrophobic polymer (e.g., such as zein or other second layer material) top provides a strong moisture/water vapor barrier. Thus, application of the first and second layers as sequential layers in a laminate structure allows each layer to substantially cover the entire coating surface and provide its barrier function.

In a refinement, wherein the substrate comprises a porous substrate (e.g., where the with the omniphobic coating and/or first layer thereof at least partially filling substrate pores).

In a particular refinement, the porous substrate comprises a porous cellulosic substrate. The method and coated articles generally can use any porous substrate, cellulosic or non-cellulosic, for example porous metal substrates, porous plastic (e.g., polymeric foam) substrates, and porous cellulosic substrates. A cellulosic substrate generally includes at least one of cellulose and hemicellulose, and it can further include lignin (e.g., as a lignocellulosic substrate).

In a more particular refinement, the cellulosic substrate is selected from the group of paper, corrugated board, cardboard, wood, and fabric. The cellulosic substrate can be selected from the group of paper (bleached, unbleached, coated (pores still remains) and uncoated, supercallendered), corrugated board, cardboard, wood, and fabric (or textile). More generally, the cellulosic substrate is not particularly limited, and can be formed from any cellulosic material desired for protection with an omniphobic coating, in particular given the good, broad adhesive capabilities of the omniphobic composition. For example, the substrate can be a molded fiber containers, paper, paperboard, wood, or fabric (or textile). Examples of paper substrates can include generally thinner, flexible papers, for example useful as wrapping materials, as well as generally thicker, rigid papers or cardboard (e.g., corrugated paper cardboard, paperboards), for example useful as box, container, plate, cup, or other storage or food-service items. Suitable wood materials can be any type of wood commonly used in home, office, and outdoor settings. Suitable fabric or textile materials can include any cellulosic materials commonly used in garments or otherwise, such as cotton, jute, flax, hemp, etc.

In a more particular refinement, the cellulosic substrate is in the form of a food-service article selected from the group consisting of a drinking cup, a food plate, a food container (e.g., take-out container), and a food wrapper.

In a more particular refinement, the cellulosic substrate is in the form of a packaging box (e.g., corrugated boxes, cardboard boxes, cartons).

In a refinement, the substrate comprises a hydrophobic and optionally oleophilic third layer (e.g., zein) adjacent to the first layer at a position further from the second layer than the first layer. This can represent an additional water-repellent layer, such as having a zein-chitosan-zein structure. The two opposing outer layers (i.e., second and third layers) provide hydrophobic barrier properties for transmission through the coating/film, and the inner layer (i.e., first layer) provides oleophobic barrier properties for transmission through the coating/film. In a further refinement, the article is in the form of a free-standing film (e.g., as a film that can be used to package food items, mulch films).

In a refinement, the omniphobic coating comprises a fourth layer between the first layer and the second layer (e.g., considering that the substrate could be a third layer in some refinements as described above). More generally, the omniphobic coating can include more than two layers with the same approach in that the layer close to the paper or substrate is oil-repellent, the second layer further from the substrate is water-repellent, and the fourth layer may be an additional layer to further improve the water resistance of the second layer, whether it is positioned between the first and second layers or on top of the second layer. Suitable examples include chitosan-zein-wax and chitosan-zein-plant oil. In addition, the omniphobic coating can include one or more additional layers between the first and second layers, for example to improve adhesion between the first and second layers and/or to provide additional functionality to the omniphobic coating. For example, an omniphobic coating can include chitosan-casein-zein as the first, fourth, and second layers, respectively.

In a refinement, the substrate has opposing first and second surfaces (e.g., top and bottom sides of a cellulosic or other substrate); and the omniphobic coating comprises a first omniphobic coating adjacent to the first substrate surface and a second omniphobic coating adjacent to the second substrate surface (e.g., both sides of the substrate are coated with an omniphobic coating as defined herein, with the oleophobic and hydrophilic first layer adjacent to the substrate surface and the hydrophobic and optionally oleophilic second layer adjacent to the first layer on each side).

In a refinement, the omniphobic coating further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof. The additives can be included in the any or all layers of the omniphobic coating as applied to the (porous and/or cellulosic) substrate. For example, the additives can be included in a solution or mixture containing the omniphobic (polymeric) coating (e.g., functionalized chitosan) before it is applied to the substrate. In other embodiments, the additive can be included in a solution or mixture containing the amino-functional polymer (e.g., chitosan) before it is applied to the substrate and then subsequently functionalized with the functionalized omniphobic polymer. One function of the fillers is to seal the substrate pores, in particular at relatively low levels of amino-functional polymer (e.g., chitosan) usage. For example, the inner bulk of the paper or another porous substrate may still have some trapped pores/air, but the top pores are sealed with the amino-functional polymer behaving as a sealant (or glue) along with the fillers. Without fillers, the amino-functional polymer could diffuse into the inner bulk. Also, fillers can bring color to the substrate (e.g., paper), for example using titanium dioxide filler particles as a whitening agent. Biocidal properties can also be incorporated via nanofiber fillers. Other functions of the fillers (such as antioxidants, vitamin E, anti-fungals) include increasing the shelf-life and nutritional value of the product inside the coated paper. In addition, the first and/or second layers can be loaded with active components that kill certain microorganisms (e.g., bacteria, fungi or other microorganism) such as cimmaldehyde, carvacrol, sorbic acid, and Nisin. Furthermore, cellulose nanocrystals, graphene, nanoclay, etc. as fillers can increase the gas and water vapor barrier properties.

In a refinement, the omniphobic coated article has a kit rating of 8 to 12 (e.g., 8, 9, 10, 11, or 12), as determined by TAPPI Standard Method T 599 pm-96 (preferably, 11 or 12).

In a refinement, the omniphobic coated article has a cobb value in range from 0.1 or 1.0 to 20 g/m$^2$ (e.g., at least 0.1, 0.2, 0.5, 1, 2, 3, or 5 and/or up to 5, 8, 10, 12, 15, or 20), as determined by TAPPI standard T441 om-09 protocol.

In a refinement, the omniphobic coating has a thickness ranging from 0.01 µm to 500 µm, 0.01 µm to 1000 µm, or 0.01 µm to 3000 µm. More generally, the omniphobic coating can have any desired thickness on the substrate. In common applications, the coating has a thickness ranging from 0.010 µm to 500 µm, 0.01 µm to 1000 µm, or 0.01 µm to 3000 µm, for example at least 0.01, 10, 20, 50, or 100 µm and/or up to 200, 500, 1000, or 3000 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate to form even thicker layers of the coating (e.g., above 500 µm, 1000 µm, or otherwise) if desired.

In a refinement, the omniphobic coated article has a relative permeability for water vapor of 0.5 or less, relative to a corresponding (porous) substrate without the omniphobic coating thereon. For example, the omniphobic coated article can have a relative permeability for water vapor of at least 0.00001, 0.0001, 0.001, 0.01, 0.1, 0.2, or 0.3 and/or up to 0.3, 0.4, or 0.5 relative to a corresponding (porous) substrate without the omniphobic coating thereon (e.g., based on absolute water vapor transmission rates for the coated article and uncoated (porous) substrate). Alternatively or additionally, the omniphobic coated article can have a relative permeability for non-water gas of at least 0.00001, 0.0001, 0.001, 0.01, 0.1, 0.2, or 0.3 and/or up to 0.3, 0.4, or 0.5 relative to a corresponding (porous) substrate without the omniphobic coating thereon, for example including one or more gases such as oxygen, nitrogen, carbon dioxide, and other common components of air.

In a refinement, the omniphobic coated article has a relative uptake for liquid water of 0.5 or less, relative to a corresponding (porous) substrate without the omniphobic coating thereon. For example, the omniphobic coated article can have a relative uptake (or gain) for liquid water of at least 0.00001, 0.0001, 0.001, 0.01, 0.1, 0.2, or 0.3 and/or up to 0.3, 0.4, or 0.5 relative to a corresponding (porous) substrate without the omniphobic coating thereon (e.g., based on absolute liquid water uptake or gain rates (such as in mass/area) for the coated article and uncoated (porous) substrate).

In a refinement, the first layer is present in the omniphobic coating in an amount in range from 0.1 wt. % to 5 wt. %, 0.1 wt. % to 10 wt. %, 0.1 wt. % to 20 wt. % relative to the substrate (e.g., at least 0.1, 0.2, 0.5, 1, 1.5, or 2 wt. % and/or up to 1, 2, 3, 4, 5, 6, 8, 10, 12, 15, or 20 wt. %).

In a refinement, the second layer is present in the omniphobic coating in an amount in range from 0.1 wt. % to 5 wt. %, 0.1 wt. % to 10 wt. %, 0.1 wt. % to 40 wt. % relative to the substrate (e.g., at least 0.1, 0.2, 0.5, 1, 1.5, or 2 wt. % and/or up to 1, 2, 3, 4, 5, 6, 8, 10, 12, 15, 20, or 40 wt. %).

In some refinements, the omniphobic properties of the omniphobic coated article or corresponding coating can be characterized in terms of one or more contact angles and/or sliding angles for water and/or oil droplets (e.g., vegetable oil and/or hexadecane) on the thermoset coating (e.g., as a coating on a substrate). In a refinement, the omniphobic coating has a water contact angle in a range from 90° to 120°. In a refinement, the omniphobic coating has an oil contact angle in a range from 1° to 65°. In a refinement, the omniphobic coating has a water sliding angle in a range from 1° to 30° or 1° to 80° for a 75 µl droplet. In a refinement, the omniphobic coating has a water sliding angle in a range from 1° to 20° for a 25 µl droplet. In a refinement, the omniphobic coating is resistant to the spreading of oil on its surface. More generally, the omniphobic properties of the omniphobic coated article or corresponding coating can be characterized in terms of one or more contact angles and/or sliding angles for water and/or oil droplets (e.g., vegetable oil and/or hexadecane) on the thermoset coating (e.g., as a coating on a substrate). The following ranges are representative of articles and coatings according to the disclosure which display favorable omniphobic properties. In an embodiment, the article or coating has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the article or coating has an oil contact angle in a range from 0° or 1° to 65° (e.g., at least 1°, 10°, 20°, or 30° and/or up to 40°, 50°, 60°, or 65°; such as for the cured or final composition as a coating). In an embodiment, the article or coating has a water sliding angle in a range from 0° or 1° to 30° or 1° to 80° for a 75 µl droplet (e.g., at least 1°, 2°, 4°, 6°, or 8° and/or up to 10°, 15°, 20°, 30°, 40°, 60°, or 80°; such as for the cured or final composition as a coating). In an embodiment, the article or coating has an oil sliding angle in a range from 0° or 1° to 20° for a 25 µl droplet (e.g., at least 1°, 2°, 4°, 6°, or 8° and/or up to 10°, 12°, 15°, or 20°; such as for the cured or final composition as a coating). The contact angles for the omniphobic article or coating can be higher when nanofillers (e.g., clay, silica, etc.) are included in the composition as compared to a corresponding composition without any nanofillers. For example, in the case of articles or coatings further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing articles or coatings can range from 0° or 1° to 20° for a 25 µl droplet.

In another aspect, the disclosure relates to a method for forming an omniphobic coated article, the method comprising: providing a substrate (e.g., porous and/or cellulosic substrate); and applying an oleophobic and hydrophilic first layer (e.g., chitosan layer) over the substrate; and applying a hydrophobic and optionally oleophilic second layer (e.g., zein) over the first; wherein the first layer and the second layer collectively form an omniphobic coating adjacent to the substrate (e.g., bound or adhered thereto). The substrate, first layer, and second layer can include any of the variations noted above. As above, the first layer can be directly or indirectly applied to the substrate, such as with or without an applied intervening layer to improve adhesion or other function. Similarly, the second layer can be directly or indirectly applied to the first layer, such as with or without an applied intervening layer to improve adhesion or other function. The omniphobic coating as a whole can be directly or indirectly on or adhered to the substrate.

Various refinements of the disclosed method are possible.

In a refinement, applying the first layer comprises: applying a first (typically aqueous) mixture to the substrate, the first mixture comprising water and material constituting the first layer therein (e.g., dissolved in solution in the water, a non-dissolved aqueous dispersion in the water); and at least partially drying (e.g., fully or semi-dried) the substrate, thereby removing the water partially or fully and forming the first layer from the remaining material. The first drying step suitably does not include a reaction or curing process. Drying removes the water medium and any other solvents therein, and the remaining material from the original mixture forms the first layer (e.g., as a dried film or coating on the substrate). The first mixture generally includes the first layer material at a concentration of 0.1 wt. % to 30 wt. % (e.g., at least 0.1, 0.2, 0.5, 1, 2, 5, or 10 wt. % and/or up to 1, 2, 5, 10, 15, 20, 25, or 30 wt. %).

In a refinement, applying the second layer comprises: applying a second mixture to the substrate, the second mixture comprising a solvent and material constituting the second layer therein (e.g., dissolved in solution in the solvent, a non-dissolved dispersion in the solvent); and drying the substrate, thereby removing the solvent and forming the second layer from the remaining material. Similar to the first layer, the second drying step suitably does not include a reaction or curing process. Drying removes the solvent medium, and the remaining material from the original mixture forms the second layer (e.g., as a dried film or coating on the first layer). The second mixture generally includes the second layer material at a concentration of 0.1 wt. % to 40 wt. % (e.g., at least 0.1, 0.2, 0.5, 1, 2, 5, or 10 wt. % and/or up to 1, 2, 5, 10, 15, 20, 25, 30, or 40 wt. %). Suitable solvents include, for example, ethanol, an ethanol-water mixture, methanol, a methanol-water mixture, and other alcohol or alcohol-water mixtures. Optionally, polar aprotic organic solvents can also be used as carriers for applying the second layer.

Applying the first mixture to the substrate and applying the second mixture to the first layer can include dip coating, spraying, using a drawdown bar (e.g., wire wound applicator), etc., and the methods for each mixture/layer can be the same or different. Drying removes the water and/or other solvents present. When the substrate is a cellulosic substrate or other substrate including hydrogen bonding groups such as hydroxyl and/or amino-groups, application of the first mixture can further include the formation of hydrogen bonds between the substrate and the first layer material as a means for adhesion, such as when the first layer material also has hydroxyl and/or amino-groups (e.g., as in chitosan). Such adhesion is generally non-covalent and is reversible during recycling treatment of the coated substrate by aqueous extraction under appropriate conditions to remove and separate the omniphobic polymeric coating from the underlying substrate. In certain cases, if highly thick coating is desired, one can use compression molding, and curtain coating for application of the first and/or second layers.

When the first mixture includes an amino-functional polymer (e.g., chitosan) as first layer material, the amino-functional polymer (chitosan) and corresponding first layer optionally includes cationic ammonium groups (e.g., $-NH_3^+$ groups, for example as a result of acidification of pendant amino ($-NH_2$) groups of native amino-functional polymer or chitosan with an acid for dissolution in water and coating of the cellulosic or other porous substrates). The amino-functional polymer or chitosan generally forms a smooth outer coating surface, with the amino-functional polymer or chitosan penetrating and filling internal pores, which might be present in an underlying cellulosic or other porous substrate. The method further comprises (optionally) neutralizing the amino-functional polymer (e.g., chitosan) coating, thereby converting at least some of the cationic ammonium groups to (non-ionic) amino groups (e.g., $-NH_2$ groups) and providing a neutralized amino-functional polymer (e.g., chitosan) coating as the first layer.

In a refinement, drying the substrate comprises: exposing the coated substrate (i) to a temperature from 10° C. to 180° C. and (ii) for a time from 10 sec to 10 days. Drying (partial or fully) for each layer can be at the same or different conditions relative to each other. Drying can be performed at room temperature or by heating (e.g., in an oven, with exposure to a heat lamp, hot air, etc.), for example at a temperature from 80° C. or 100° C. to 140° C. or 180° C. and/or for a time from 10 sec, 20 sec, 30 sec, 1 min, 5 min, 10 min, 20 min, 30 min, 1 hr, 2 hr, or 4 hr and/or up to 1 hr, 2 hr, 4 hr, 6 hr, 12 hr, or 24 hr. Lower heating temperature or ambient temperature drying also possible, such as room temperature drying (e.g., 20° C. to 30° C.) for 30 min, 1 hr, 6 hr, 12 hr, 1 day, 2 day, or 5 day to 2 day, or 5 day, 10 day; or lower heating (e.g., 30° C. or 40° C. to 60° C.) for 2 hr, 6 hr, 12 hr, or 1 day to 2 day or 4 day; or 60° C. to 80° C. for 2 hr, 6 hr, or 12 hr to 1 day or 3 day.

In another aspect, the disclosure relates to a method for recycling an omniphobic coated article, the method comprising: providing an omniphobic coated article according to any of any of the various disclosed embodiments; and extracting the omniphobic coated article in an aqueous extraction medium having a pH value sufficient to separate the omniphobic polymeric coating from the (porous) substrate. As both the first and second layers are physically grafted or blended, the coating materials can be washed out from coated article, for example from paper pulp during re-pulping. For example, using acetic acid solutions (40% v/v) can be used to remove both zein and chitosan or other layers from the coated paper. Alternatively, a first rinse of pulp with acetic acid (e.g., 1 wt %) can be used to remove chitosan or other first layer, and a second rinse with an ethanol/water mixture to can be used to remove zein or other second layer. Alternatively, a first rinse of pulp with an ethanol/water mixture can be used to remove zein, then a second rinse with acetic acid (e.g., 1 wt %) can be used to remove chitosan. In the case of PVOH as the first layer and zein as the second layer, a first washing with an ethanol-water mixture, an then simply rinsing with water can completely remove of the coating material. Alternatively, during the repulping, if the pulp is not washed or extracted or partially washed/extracted, the remaining coating ingredient can become part of the recycled paper.

Extraction suitably removes substantially all of the omniphobic polymeric coating from the porous or other substrate, for example at least 95, 98, or 99 wt. % and/or up to 90, 95, 98, 99, or 100 wt. % of the omniphobic coating initially present on the omniphobic coated article. Two factors affect the extraction, in particular for a cellulosic/paper substrate. First, the coating should be exposed to water during a pulping process. During pulping, the initial coating that has an hydrophobic coating on the surface (e.g., zein) and that was protecting the underlying hydrophilic coating (e.g., chitosan) and paper from water is no longer an effective barrier. Water can reach paper pulp through sides and where the hydrophobic coating is not present. This allows the hydrophilic coating to detach from the pulp. Low or high pH values facilitate the hydrophilic coating solubility in water.

In a refinement, the recycling method further comprises separating the (porous) substrate from the aqueous extraction medium; and recovering and/or reforming the (porous) substrate. Separating the porous or other substrate from the aqueous extraction medium can be performed by any suitable solid/liquid separation process, for example filtration or decantation to retain the porous substrate (fiber/pulp etc.) and remove the aqueous extraction medium with the first and second layer components therein, optionally followed by one or more washing steps to remove any residual omniphobic coating material remaining in/on the porous substrate. If the omniphobic coated article is pulped, ground, or otherwise size-reduced prior to extraction, the resulting porous substrate fragments can be recovered after separation from the aqueous extraction medium and then re-formed into a new, recycled porous substrate, for example recycled paper or other cellulosic substrate. The recovered or reformed porous substrate is substantially free from the omniphobic coating, for example having 5 wt. % or less coating material remaining relative to the initial coating material prior to extraction (e.g., at least 0.01, 0.1, 0.5, 1, or 2 wt. % and/or up to 1, 2, or 5 wt. %). Alternatively or additionally, the recovered or reformed porous substrate can have 0.1 wt. % or less coating material relative to the porous substrate (e.g., at least 0.0001, 0.001, or 0.01 wt. % and/or up to 0.001, 0.01, or 0.1 wt. %). Recycled pulp (without washing) can be used to make recycled paper, and the end paper can be recoated with a fresh or recycled omniphobic coating to make the recycled substrate again omniphobic.

In a refinement, the aqueous extraction medium for the recycling method has a pH value of up to 6 or greater than 8. Extraction can be performed in an acidic medium, for example having a pH value of at least 1, 2, 3, or 4 and/or up to 3, 4, 5, or 6, such as about 4-5 or 4-6. Extraction can be performed in a basic medium, for example having a pH value of at least 8, 9, 10, 11, or 12 and/or up to 11, 12, 13, or 14, such as about 8-12, 8-11, or 10-12. The pH value of the extraction medium can represent the initial pH value of the medium, which could change during extraction as various species are extracted from the coated article. The extraction medium generally includes water and one or more acid, base, and/or buffer components to maintain the desired pH value. In some embodiments, the extraction medium can include a light volatile alcohol (e.g., ethanol or methanol) as an alternative or supplement to water.

In a refinement, the recycling method further comprises performing a size reduction process on the omniphobic coated article prior to extracting the omniphobic coated article in the aqueous extraction medium. Size reduction can included pulping, grinding, or any other type of destructive mechanical process to fragment the coated article into smaller fragments, in particular to increase surface area exposure at interfacial regions between the porous substrate and the omniphobic coating, thereby enhancing contact between the aqueous extraction medium and hydrophilic portions of the omniphobic coating. Smaller fragment sizes generally promote extraction efficiency.

While the disclosed articles, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to omniphobic coatings, related articles including such coatings, and related method for forming such coatings or articles, for example biobased and/or biodegradable omniphobic coatings with high barrier properties. The omniphobic coating includes an oleophobic and hydrophilic first layer (e.g., chitosan, polyvinyl alcohol (PVOH)), and a hydrophobic and optionally oleophilic second layer (e.g., zein) adjacent to the first layer. A corresponding omniphobic coated article can include the omniphobic coating on a substrate such as a porous cellulosic or paper substrate, for example to provide a water- and oil/fat/grease-resistant coating as well as a high barrier against water vapors and other gases (e.g., oxygen, nitrogen, carbon dioxide) for a paper-based product. The first layer of the omniphobic coating is adjacent to the substrate and the second layer is adjacent to the first layer at a position further from the substrate than the first layer. The omniphobic coating can be applied to a substrate in a layer-by-layer process, and the coated article can be recycled by extraction to remove the coating and recover the substrate material, for example in a re-pulping process. The coated paper can also be loaded with bioactive components for active packaging applications.

Omniphobic Coated Articles

Figure 3:
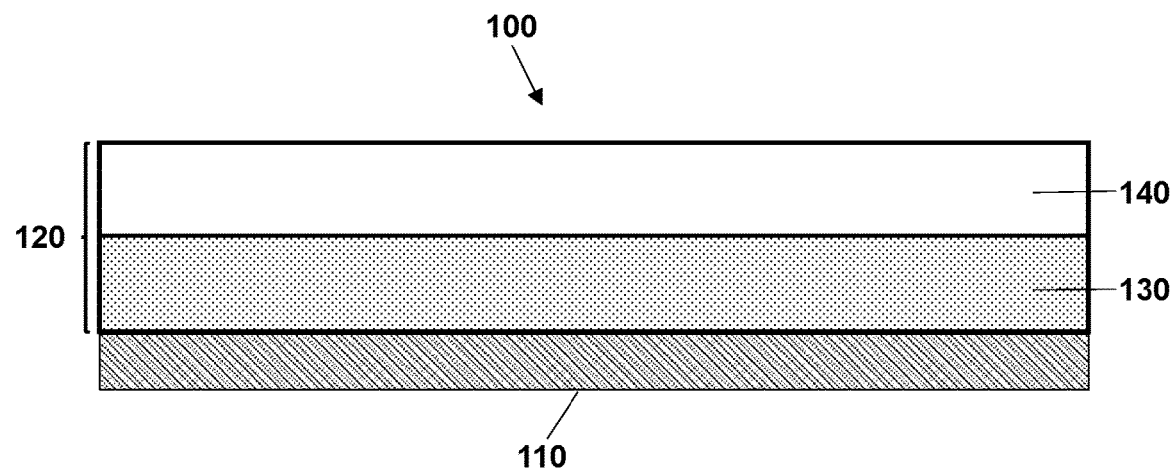
FIG. 3 is a schematic of an omniphobic coated article according to the disclosure.

As illustrated in FIG. 3, the disclosure provides an omniphobic coated article 100 including a substrate 110 and an omniphobic coating 120 adjacent to the substrate 110. The omniphobic coating 120 includes an oleophobic and hydrophilic first layer 130 adjacent to the substrate 110, and a hydrophobic and optionally oleophilic second layer 140 adjacent to the first layer 130 at a position further from the substrate 110 than the first layer 130. In general, the omniphobic coating 120 can have any desired thickness on the substrate 110. In embodiments, the omniphobic coating 120 has a thickness ranging from 0.01 µm to 500 µm, 0.01 µm to 1000 µm, or 0.01 µm to 3000 µm, for example at least 0.01, 10, 20, 50, or 100 µm and/or up to 200, 500, 1000, or 3000 µm, such as 0.01, 0.05, 0.10, 0.50, 1, 2, 5, 10, 25, 50, 75, 100, 150, 200, 250, 300, 350, 400, 450, 500, 600, 700, 800, 900, 1000, 1200, 1400, 1500, 1600, 1800, 2000, 2250, 2500, 2750, or 3000 µm. Typical cast coatings can have thicknesses of 10 µm to 100 µm. Typical spin coatings can have thicknesses of 0.05 µm or 0.10 µm to 0.20 µm or 0.50 µm. As described herein, multiple coating layers can be applied to substrate 110 to form even thicker layers of the omniphobic coating 120 (e.g., above 500 µm, 1000 µm, or otherwise) if desired.

Figure 5:
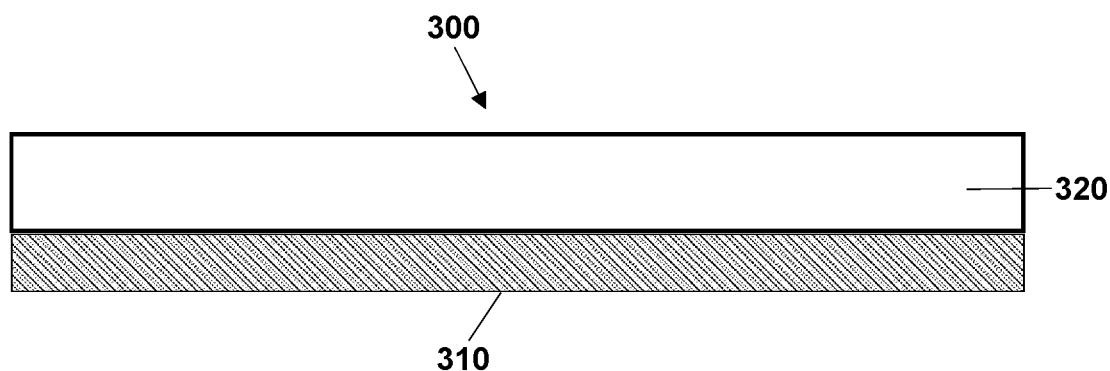
FIG. 5 is a schematic of a coated article.
Figure 6:
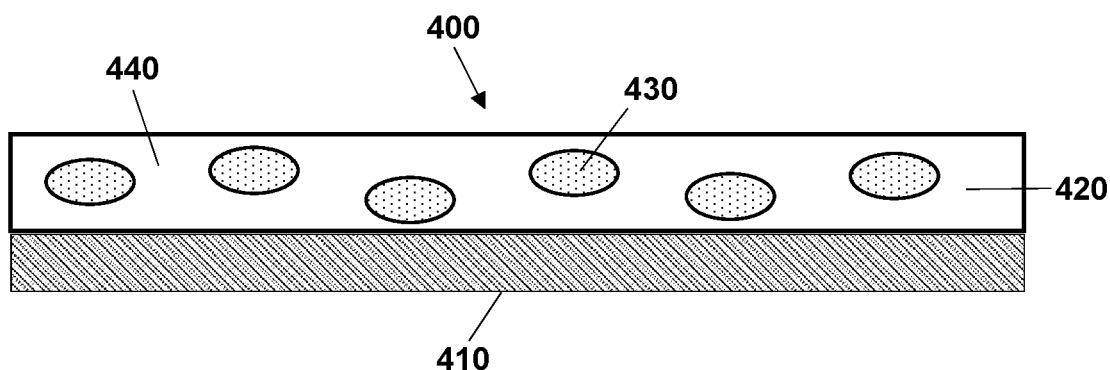
FIG. 6 is a schematic of a coated article.

Advantageously, the articles according to the disclosure include two-layer coatings, as opposed to single-coating layers. In contrast, FIG. 5 shows a comparative coated article 300, which includes a substrate 310 and a coating 320. The coating 320 can be water-repellant and/or oil-repellant. Such single-layer coatings might disadvantageously rely on fluorinated components or an underlying plastic-laminated substrate to obtain suitable repellency properties. Another single-layer coating having both water-repellant domains and oil-repellant domains is shown in FIG. 6. FIG. 6 illustrates another comparative coated article 400, which includes a substrate 410 and a coating 420, having water-repellant domains 430 and oil-repellant domains 440. This single-layer coating could be prepared, for example, by admixing chitosan as the oil-repellant material, and zein as the water-repellant material and applying as a single layer. Here, the single-layer coating is inhomogeneous, for example having discrete water-repellant domains 430 distributed throughout a continuous oil-repellant domain 440 as illustrated, although either domain 430, 440 can be a discrete, discontinuous domain in the single-layer coating. These articles fail against each of water and oil, however, because each of water-repellant domains 430 absorb oil and the oil-repellant domains 440 absorb water, thus providing discontinuous and inconsistent repellency properties across the coated surface.

The omniphobic coating and corresponding article can be microwaveable (e.g., due to the high thermal stability of the coating ingredients) and/or sealable (e.g., thermally sealable in the presence of moisture/plasticizer, such as on a semi-dried coated paper or other substrate).

First Layer

As provided herein, the first layer of the omniphobic coating is oleophobic and hydrophilic. That is, the first layer is generally oil-repellant (e.g., oleophobic) and water-absorbant (e.g., hydrophilic). The first layer can be water-insoluble or water-soluble. Examples of suitable first layer materials (that are oleophobic and hydrophilic) include, but are not limited to polysaccharides, synthetic polymers, water-soluble proteins, and combinations thereof. Examples of suitable polysaccharides include, but are not limited to chitosan, alginate, and starch. Examples of suitable synthetic polymers include, but are not limited to polyvinyl alcohol (PVOH), poly(1-vinyl-2-pyrrolidinone), poly(N-isopropylacrylamide), polyethylene glycol (PEG), and polyethylene imine (PEI)). Examples of suitable water-soluble proteins include, but are not limited to caseins and caseinates and soy protein. In embodiments, the first layer includes at least one oleophobic and hydrophilic polymer. In embodiments, the first layer includes chitosan. In embodiments, the first layer includes PVOH. In some embodiments, the first layer can be crosslinked (e.g., including a crosslinked polymer therein), for example to improve resistance against liquid penetration and to improve mechanical properties. The crosslinking can be promoted through addition, condensation, displacement, sol-gel reactions, etc.

In embodiments, the first layer includes a hydroxy-functional polymer having a plurality of free hydroxy groups. Free hydroxy groups in the first layer, for example those in chitosan (which can be fully and/or partially hydrolyzed), PVOH (which can be fully and/or partially hydrolyzed), starch (which can be unmodified and/or partially modified), casein and casein salts, and alginates, can promote compatibility/adhesion of the first layer to a cellulosic substrate and contribute to the oleophobic and hydrophilic character of the first layer. The first layer can also provide a strong gas barrier (e.g., oxygen barrier), in particular at low relative humidity, for example when the first layer includes PVOH and/or chitosan.

In embodiments, the first layer includes an amino-functional polymer having a plurality of free amino groups. Free amino groups in the first layer, for example those in chitosan, can promote compatibility/adhesion of the first layer to an amide-containing second layer (e.g., zein, other protein, or other water-insoluble biodegradable polymers) and contribute to the oleophobic and hydrophilic character of the first layer. Some or all of the amino groups can be in their corresponding ammonium form ($-NH_4^+$), for example as a result of being solubilized under acidic conditions in an aqueous solution for application to the substrate. In embodiments, the first layer includes a polymer having both of amino and hydroxy groups, such that the hydroxy-functional polymer and the amino-functional polymer are the same polymer (e.g., as in chitosan). Alternatively, the amino and hydroxy groups can be in the different polymers blended together in the first layer (e.g., chitosan (having both) and PVOH (having only hydroxyl groups).

In embodiments, the first layer includes an acetate-functional polymer having a plurality of acetate groups ($CH_3COO^-$), alkanoate groups (e.g., $CH_3(CH_2)_nCOO^-$, for $n \geq 1$ such as 1, 2, or 3), and/or amide ($-C(=O)NR_2$; R=H, alkyl, etc.) groups. The acetate groups can be in the form of pendant ester groups, such as in polyvinylacetate. Alternatively or additionally, the acetate groups can be combined with hydroxy groups (e.g., in partially hydrolyzed PVOH or otherwise) and/or amino groups. The acetate groups can improve compatibility/adhesion of the first layer to the second layer.

In embodiments, the first layer can be made of a layer-by-layer combination of oppositely charged polymers such as PEI and polyacrylic acid (PAA) to render strong gas barrier properties, for example as a single bilayer or as multiple layers of each polymer. As a stand-alone first layer, the strong gas barrier properties can be degraded at high relative humidity due to water absorption. Advantageously, when coated with second layer materials according to the disclosure, however, the overall gas barrier properties of the omniphobic coating can be retained even at relatively high humidity. Such systems can work on application to porous substrates (e.g., paper) or can be used for free-standing films. For example, free standing films can be made of zein/(PEI-PAA)/zein, where PEI-PAA may be a single bilayer, or a multilayer film by itself. In the case of a coating or paper or other substrate, PEI-PAA layer(s) could be applied on the substrate as the first layer and then coated with zein or other second layer material.

The first layer can be directly or indirectly on or adhered to the substrate, such as with or without an intervening layer to improve adhesion or other function. In embodiments, the first layer is directly on or adhered to the substrate (e.g., without an intervening layer). In embodiments, the first layer is indirectly on or adhered to the substrate (e.g., with an intervening layer). The first layer and the underlying substrate can be protected from water absorption and/or water dissolution by the overlying second layer. The first layer is closer to the substrate than the second layer. The first and second layers may be distinctly separate layers with little intermingling at the interface or partially diffused into each other at the interface. For example, in embodiments, the first and second layers can be distinctly separate layers due to poor or very limited interfacial diffusion of the two layers into each other. In embodiments, both layers have significantly high interfacial diffusion into each other, for example when the second layer is applied on a semi-dry first layer.

The first layer can be present in the omniphobic coating in an amount in range from 0.1 wt. % to 5 wt. %, 0.1 wt. % to 10 wt. %, or 0.1 wt. % to 20 wt. % relative to the substrate. For example, the first layer can be present in the omniphobic coating in an amount of at least 0.1, 0.2, 0.5, 1, 1.5, or 2 wt. % and/or up to 1, 2, 3, 4, 5, 6, 8, 10, 12, 15, or 20 wt. %, such as 0.1, 0.2, 0.5, 1, 1.5, 2, 2.5, 3, 3.5, 4, 4.5, 5, 6, 7, 8, 9, 10, 11, 12, 13, 14, 15, 16, 17, 18, 19, or 20 wt %, relative to the substrate.

Second Layer

As provided herein, the second layer of the omniphobic coating is hydrophobic. Optionally, the second layer can be oleophilic. That is, the second layer is generally water-repellant (e.g., hydrophobic) and can (but is not required to) be oil-absorbant (e.g., oleophilic). Examples of suitable second layer materials (e.g., that are hydrophobic and optionally oleophilic) include, but are not limited to, hydrophobic polymers or proteins, modified or unmodified plant proteins, water-insoluble, non-protein (but dispersible) materials, and combinations thereof. Examples of suitable plant proteins (which can be modified or unmodified) include, but are not limited to, those derived from one or more of wheat, barley, rye, corn, sorghum, and oats. In embodiments, the second layer includes a hydrophobic polymer. Examples of suitable water-insoluble, non-protein (but dispersible) materials include, but are not limited to, biodegradable materials, such as acetylated starch and PHAs, compostable materials, such as PLA, or non-biodegradable materials, such as alkyl ketene dimer (AKD), polystyrene latex, and/or acrylic emulsion. In some embodiments, the second layer can be crosslinked (e.g., including a crosslinked polymer therein), for example to improve resistance against liquid penetration and to improve mechanical properties. The crosslinking can be promoted through addition, condensation, displacement, sol-gel reactions, etc.

In embodiments, the second layer includes a modified or unmodified plant protein. In some embodiments, the second the modified or unmodified plant protein is derived from one or more plants (e.g., including one or more of their associated protein(s)) such as wheat (gliadin, gluten), barley (hordein, gluten), rye (secalin, gluten), corn (zein), sorghum (kafirin), and oats (avenin, gluten). In embodiments, the plant protein is selected from gliadin, hordein, secalin, zein, kafirin, avenin, and combinations thereof. In embodiments, the second layer includes gluten. In embodiments, the second layer includes zein. In embodiments, the second layer includes a water-insoluble, non-protein (but dispersible) material. In embodiments, the second layer includes AKD.

The second layer is adjacent to the first layer at a position further from the substrate than the first layer. In embodiments, the first and second layers are adhered to each other through physical interactions. In embodiments, the first and second layers are adhered to each other through chemical interactions. The materials for the second layer are preferably biodegradable.

The second layer can be present in the omniphobic coating in an amount in range from 0.1 wt. % to 5 wt. %, 0.1 wt. % to 10 wt. %, or 0.1 wt. % to 40 wt. % relative to the substrate. For example, the second layer can be present in the omniphobic coating in an amount of at least 0.1, 0.2, 0.5, 1, 1.5, or 2 wt. % and/or up to 1, 2, 3, 4, 5, 6, 8, 10, 12, 15, 20, or 40 wt. %, such as 0.1, 0.2, 0.5, 1, 1.5, 2, 2.5, 3, 3.5, 4, 4.5, 5, 6, 7, 8, 9, 10, 11, 12, 13, 14, 15, 16, 17, 18, 19, 20, 22, 24, 26, 28, 30, 32, 34, 36, 38, or 40 wt %, relative to the substrate.

In general, the first and/or second layer can be used in the unmodified form, or can be further treated to enhance/modify certain properties. For example, to increase the release properties, low surface energy materials can be added to the first and/or second layers. In embodiments, the top layer can be made of a polymer modified with vegetable oil to reinforce the water resistance of the top layer. For example, starch, if hydrophobized with plant oil, can be used as top layer. Alternatively or additionally, either or both of the first and second layers may not include or are otherwise free from omniphobic polymers, for example as blends with the other layer materials and/or as reaction products/copolymers (e.g., graft, block, random, or other copolymer) with the other layer materials. Examples of such omniphobic polymers include, but are not limited to, polysiloxanes, polyperfluoroethers, polybutadienes, polyisobutenes, branched polyolefins, poly(meth)acrylates, polyesters (e.g., low-Tg polyesters such as low molecular weight poly(lactic acid), poly(hydroxyalkanoates)), vegetable oils, and functionalized derivatives thereof. Such functionalized derivatives include the foregoing omniphobic polymers with a further reactive functional group (e.g., isocyanate, epoxide, carboxylic acid) that could otherwise react with a functional group in the first or second layers (e.g., amino, hydroxy), and their corresponding reaction products. In embodiments, the first layer and the second layer are free of omniphobic polymers.

In embodiments, the materials forming the first layer and the materials forming the second layer would form an incompatible (e.g., heterogeneous) mixture if blended together. In general, the materials suitable for the first and second layers tend to form incompatible or inhomogeneous mixtures in the absence of a compatibilizers promoting physical compatibility between the components and/or reacting/covalently linking the components. Such an inhomogeneous mixture could result in the heterogeneous dispersed phase not providing its respective barrier function (e.g., water- or oil-repellency, gas barriers, etc.) across substantially the entire coating surface, for example as illustrated in FIG. 6. In addition to the water- and oil-repellency properties, the omniphobic coating can also provide a barrier to gases, water vapor, aromas, etc. In general, a hydrophilic polymer (e.g., in the first layer) provides a strong oxygen barrier, and a hydrophobic polymer (e.g., such as zein or other second layer material) top provides a strong moisture/water vapor barrier. Thus, application of the first and second layers as sequential layers in a laminate structure can allow each layer to substantially cover the entire coating surface and provide its barrier function.

Substrate

As provided herein, the omniphobic coated articles of the disclosure include a substrate. Examples of suitable substrates include, but are not limited to, porous substrates and other substrates, for example hydrophobic substrates for use in free-standing films. For example, free-standing films can be made of zein/(PEI-PAA)/zein, where PEI-PAA may be a single bilayer, or a multilayer film by itself can be used. Other representative free-standing films include zein/chitosan/zein, zein/starch/zein, and zein/PVOH/zein. In these examples, the zein layers can correspond to the substrate and the second layer, and the PEI-PAA, chitosan, starch, or PVOH can correspond to the first layer therebetween. In the case of a coating on paper or other substrate, PEI-PAA, chitosan, starch, or PVOH layer(s) can be applied on the substrate as the first layer and then coated with zein or other second layer material.

In embodiments, the substrate is a porous substrate. When the substrate is a porous substrate, the omniphobic coating and/or the first layer thereof, as described herein, can at least partially fill the pores of the substrate. The coated articles generally can use any porous substrate, cellulosic or non-cellulosic, for example porous metal substrates, porous plastic (e.g., polymeric foam) substrates, and porous cellulosic substrates. A cellulosic substrate generally includes at least one of cellulose and hemicellulose, and it can further include lignin (e.g., as a lignocellulosic substrate).

In general, when the substrate is a cellulosic substrate, the cellulosic substrate is not particularly limited, and can be formed from any cellulosic material desired for protection with an omniphobic coating. For example, the substrate can be a molded fiber containers, paper, paperboard, wood, or fabric (or textile). Examples of paper substrates can include, but are not limited to, generally thinner, flexible papers, for example useful as wrapping materials, as well as generally thicker, rigid papers or cardboard (e.g., corrugated paper cardboard, paperboards), for example useful as box, container, plate, cup, or other storage or food-service items. Suitable wood materials can be any type of wood commonly used in home, office, and outdoor settings. Suitable fabric or textile materials can include any cellulosic materials commonly used in garments or otherwise, such as cotton, jute, flax, hemp, etc.

In embodiments, the porous substrate includes a porous cellulosic substrate. In embodiments, the cellulosic substrate includes paper, corrugated board, cardboard, wood, fabric, and any combination thereof. The cellulosic substrate can be selected from the group of paper (bleached, unbleached, coated (pores still remains) and uncoated, supercallendered), corrugated board, cardboard, wood, and fabric (or textile). In embodiments, the cellulosic substrate is in the form of a food-service article such as a drinking cup, a food plate, a food container (e.g., take-out container), and a food wrapper. In some embodiments, the cellulosic substrate is in the form of a packaging box (e.g., corrugated boxes, cardboard boxes, cartons).

The substrate can include a hydrophobic, and optionally oleophilic, third layer (e.g., zein) adjacent to the first layer at a position further from the second layer than the first layer. That is, in some embodiments, the substrate is the third layer, such as when the article is a free-standing film. This can represent an additional water-repellent layer, such as having a zein-chitosan-zein structure. The two opposing outer layers (i.e., second and third layers) provide hydrophobic barrier properties for transmission through the coating/film, and the inner layer (i.e., first layer) provides oleophobic barrier properties for transmission through the coating/film. In embodiments, the article is in the form of a free-standing film (e.g., as a film that can be used to package food items, mulch films). Such a free-standing film structure can also be represented by FIG. 3, where the article 100 includes the oleophobic and hydrophilic first layer 130 in between (1) the hydrophobic and optionally oleophilic second layer 140 and (2) the substrate 110, which is in the particular form of the hydrophobic and optionally oleophilic third layer.

Figure 4:
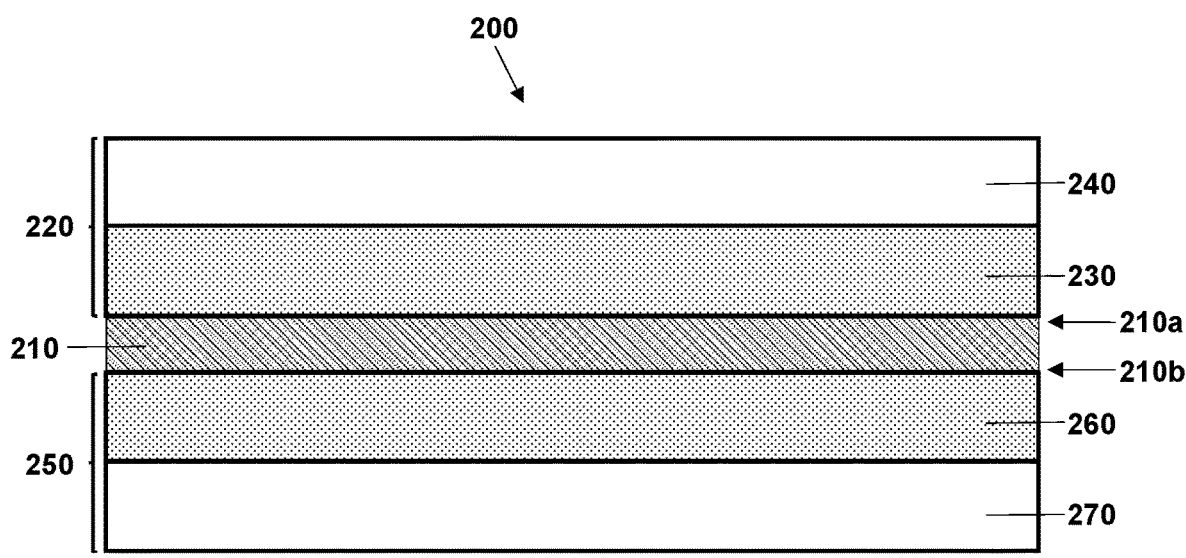
FIG. 4 is a schematic of an omniphobic coated article according to the disclosure.

In embodiments, the substrate has opposing first and second surfaces, and both surfaces of the substrate are coated with an omniphobic coating as described herein. For example, as illustrated in FIG. 4, in embodiments, the disclosure relates to an omniphobic coated article 200 including a substrate 210 having opposing first and second surfaces (210*a* and 210*b*, respectively). The article 200 includes a first omniphobic coating 220 adjacent to the first substrate surface 210*a*, and a second omniphobic coating 250 adjacent to the second substrate surface 210*b*. The first omniphobic coating 220 can include an oleophobic and hydrophilic first layer 230 adjacent to the first substrate surface 210*a*, and a hydrophobic and optionally oleophilic second layer 240 adjacent to the first layer 230 at a position further from the substrate 210 than the first layer 230. The second omniphobic coating 250 can include an oleophobic and hydrophilic first layer 260 adjacent to the second substrate surface 210*b*, and a hydrophobic and optionally oleophilic second layer 270 adjacent to the first layer 260 at a position further from the substrate 210 than the first layer 260. The materials in the opposing first layers 230, 260 can be the same or different. Likewise, the materials in the opposing second layers 240, 270 can be the same or different.

Additional Features

In general, the omniphobic coating can include more than two layers with the same approach in that the layer close to the paper or substrate is oil-repellent, the second layer further from the substrate is water-repellent. For example, the omniphobic coating can further include a fourth layer between the first layer and the second layer, or on top of the second layer (e.g., further from the substrate than the second layer). That is, considering that, in embodiments, the substrate is a third layer as described above, the omniphobic coating can include a fourth layer between the first and second layers. The fourth layer can be an additional layer to further improve the water resistance of the second layer, whether it is positioned between the first and second layers or on top of the second layer. Suitable examples include chitosan-zein-wax and chitosan-zein-plant oil. Additionally, the omniphobic coating can include one or more additional layers between the first and second layers, for example to improve adhesion between the first and second layers and/or to provide additional functionality to the omniphobic coating. For example, an omniphobic coating can include chitosan-casein-zein as the first, fourth, and second layers, respectively.

The omniphobic coating can further include an additive (e.g., a filler). Examples of suitable additives include, but are not limited to, nanoclays, graphene oxide, graphene, silicon dioxide (silica), aluminum oxide, cellulose nanocrystals, carbon nanotubes, titanium dioxide (titania), diatomaceous earth, biocides, pigments, dyes, and thermoplastics. The additives can be included in any one layer or all layers of the omniphobic coating as applied to the (porous and/or cellulosic) substrate. For example, the additives can be included in a solution or mixture containing the omniphobic (polymeric) coating (e.g., functionalized chitosan) before it is applied to the substrate. In embodiments, the additive can be included in a solution or mixture containing the amino-functional polymer (e.g., chitosan) before it is applied to the substrate and then subsequently functionalized with the functionalized omniphobic polymer. Advantageously, the additives (e.g., fillers) can aid in sealing the substrate pores, in particular at relatively low levels of amino-functional polymer (e.g., chitosan) usage. For example, the inner bulk of the paper or another porous substrate may still have some trapped pores/air, but the top pores are sealed with the amino-functional polymer behaving as a sealant (or glue) along with the fillers. Without fillers, the amino-functional polymer could diffuse into the inner bulk. Also, fillers can bring color to the substrate (e.g., paper), for example using titanium dioxide filler particles as a whitening agent. Biocidal properties can also be incorporated via nanofiber fillers. Other functions of the fillers (such as antioxidants, vitamin E, anti-fungals) include increasing the shelf-life and nutritional value of the product inside the coated paper. In addition, the first and/or second layers can be loaded with active components that kill certain microorganisms (e.g., bacteria, fungi or other microorganism) such as cimmaldehyde, carvacrol, sorbic acid, and Nisin. Furthermore, cellulose nanocrystals, graphene, nanoclay, etc. as fillers can increase the gas and water vapor barrier properties. In embodiments, the omniphobic coating includes one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

The omniphobic coated article can have a kit rating of 8 to 12, for example at least 8, 9, 10, or 11 and/or up to 12, 11, 10, or 9. The kit rating can be determined by TAPPI Standard Method T 599 pm-96, and relates to the grease or oil resistance of the article. In embodiments, the omniphobic coated article has a kit rating of 12. In embodiments, the omniphobic coated article has a kit rating of 11.

The omniphobic coated article can have a cobb value in range from 0.1 or 1.0 to 20 $g/m^2$, for example at least 0.1, 0.2, 0.5, 1, 2, 3, or 5 $g/m^2$ and/or up to 5, 8, 10, 12, 15, or 20 $g/m^2$. The cobb value can be determined by TAPPI Standard Method T441 om-09, and relates to the water absorptiveness of the article. In embodiments, the omniphobic coated article has a cobb value of 12 $g/m^2$ or less (e.g., from 0.1 $g/m^2$ to 12 $g/m^2$). In embodiments, the omniphobic coated article has a cobb value of 10 $g/m^2$ or less (e.g., from 0.1 $g/m^2$ to 10 $g/m^2$).

The omniphobic coated article can have a relative permeability for water vapor of 0.5 or less, relative to a corresponding (porous) substrate without the omniphobic coating thereon. For example, the omniphobic coated article can have a relative permeability for water vapor of at least 0.00001, 0.0001, 0.001, 0.01, 0.1, 0.2, or 0.3 and/or up to 0.3, 0.4, or 0.5, such as 0.00001, 0.00005, 0.0001, 0.0005, 0.001, 0.005, 0.01, 0.05, 0.1, 0.2, 0.3, 0.4, or 0.5, relative to a corresponding (porous) substrate without the omniphobic coating thereon. That is, the omniphobic coated article can have a relative permeability for water vapor of 0.5 or less based on absolute water vapor transmission rates for the coated article and uncoated (porous) substrate. Alternatively or additionally, the omniphobic coated article can have a relative permeability for non-water gas of at least 0.00001, 0.0001, 0.001, 0.01, 0.1, 0.2, or 0.3 and/or up to 0.3, 0.4, or 0.5, such as 0.00001, 0.00005, 0.0001, 0.0005, 0.001, 0.005, 0.01, 0.05, 0.1, 0.2, 0.3, 0.4, or 0.5, relative to a corresponding (porous) substrate without the omniphobic coating thereon. This relative permeability for non-water gas can be applicable for one or more gases such as oxygen, nitrogen, carbon dioxide, and other common components of air.

The omniphobic coated article can have a relative uptake for liquid water of 0.5 or less, relative to a corresponding (porous) substrate without the omniphobic coating thereon. For example, the omniphobic coated article can have a relative uptake (or gain) for liquid water of at least 0.00001, 0.0001, 0.001, 0.01, 0.1, 0.2, or 0.3 and/or up to 0.3, 0.4, or 0.5, such as 0.00001, 0.00005, 0.0001, 0.0005, 0.001, 0.005, 0.01, 0.05, 0.1, 0.2, 0.3, 0.4, or 0.5, relative to a corresponding (porous) substrate without the omniphobic coating thereon. That is, the omniphobic coated article can have a relative uptake for liquid water of 0.5 or less, based on absolute liquid water uptake or gain rates (such as in mass/area) for the coated article and uncoated (porous) substrate.

The omniphobic properties of the omniphobic coated article or corresponding coating can be characterized in terms of one or more contact angles and/or sliding angles for water and/or oil droplets (e.g., vegetable oil and/or hexadecane) on the thermoset coating (e.g., as a coating on a substrate).

In embodiments, the article or omniphobic coating has a water contact angle in a range from 90° to 120°, for example at least 90°, 95°, 100°, or 105° and/or up to 110°, 115°, or 120°, such as 90°, 95°, 100°, 105°, 110°, 115°, or 120°. The water contact angle can apply, for example, to the cured or final composition as a coating. In some cases, the water contact angle can be up to about 125° for non-smooth or rough surfaces. In embodiments, the article or omniphobic coating has a water sliding angle in a range from 1° to 30° or 1° to 80° for a 75 µl droplet, for example at least 1°, 2°, 4°, 6°, or 8° and/or up to 10°, 15°, 20°, 30°, 40°, 60°, or 80°, such as 1°, 5°, 10°, 15°, 20°, 25°, 30°, 35°, 40°, 45°, 50°, 55°, 60°, 65°, 70°, 75°, or 80°. In embodiments, the omniphobic coating has a water sliding angle in a range from 1° to 20° for a 25 µl droplet, such as 1°, 5°, 10°, 15°, or 20°. The water sliding angle can apply, for example, to the cured or final composition as a coating.

In embodiments, the article or omniphobic coating is resistant to the spreading of oil on its surface. In embodiments, the article or omniphobic coating has an oil contact angle in a range from 1° to 65°, for example at least 1°, 10°, 20°, or 30° and/or up to 40°, 50°, 60°, or 65°, such as 1°, 5°, 10°, 15°, 20°, 25°, 30°, 35°, 40°, 45°, 50°, 55°, 60°, or 65°. The oil contact angle can apply, for example, to the cured or final composition as a coating. In embodiments, the article or coating has an oil sliding angle in a range from 0° or 1° to 20° for a 25 µl droplet, for example at least 1°, 2°, 4°, 6°, or 8° and/or up to 10°, 12°, 15°, or 20°, such as 0°, 1°, 2°, 3°, 4°, 5°, 6°, 7°, 8°, 9°, 10°, 11°, 12°, 13°, 14°, 15°, 16°, 17°, 18°, 19°, or 20°. The oil sliding angle can apply, for example, to the cured or final composition as a coating.

The contact angles for the omniphobic article or coating can be higher when additives or nanofillers (e.g., clay, silica, etc.) are included in the composition as compared to a corresponding composition without any nanofillers. For example, in the case of articles or coatings further including one or more additives nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water (e.g., at least 100°, 110°, 120°, 130° or 140° and/or up to 150°, 140°, 130°, 120°, or) 110°, and from 20° to 120° for oil (e.g., at least 20°, 30°, 40°, 50°, 60°, 70°, and/or up to 80°, 90°, 100°, 110°, or 120°). Similarly, the sliding angles for water on the surface of nanofiller-containing articles or coatings can range from 0° or 1° to 20° for a 25 µl droplet, for example 0°, 1°, 2°, 4°, 6°, 8°, 10°, 12°, 14°, 16°, 18°, or 20°.

Methods of Forming Omniphobic Coated Articles

Also provided herein are methods of forming the omniphobic coated articles of the disclosure. The methods include providing the substrate, applying the oleophilic and hydrophilic first layer over the substrate, and applying the hydrophobic and optionally oleophilic second layer over the first layer. For example as illustrated in FIG. 3, the substrate 110 can be sequentially coated with the first layer 130 and the second layer 140 to form the coating 120 and corresponding article 100. The first layer and second layer collectively form an omniphobic coating adjacent (e.g., bound or adhered thereto) to the substrate, as described herein. The substrate, first layer, and second layer can include any of the variations described herein. In embodiments, the first layer can be directly or indirectly applied to the substrate, such as with or without an applied intervening layer to improve adhesion or other function. Similarly, the second layer can be directly or indirectly applied to the first layer, such as with or without an applied intervening layer to improve adhesion or other function. The omniphobic coating as a whole can be directly or indirectly on or adhered to the substrate.

In embodiments, applying the first layer includes applying a first mixture to the substrate and at least partially drying the substrate, thereby removing the water partially or fully and forming the first layer from the remaining material. The first mixture can include water and material constituting the first layer therein, such as chitosan, alginate, starch, or any of the first layer materials described herein. The first mixture generally includes the first layer material at a concentration of 0.1 wt. % to 30 wt. %, for example, at least 0.1, 0.2, 0.5, 1, 2, 5, or 10 wt. % and/or up to 1, 2, 5, 10, 15, 20, 25, or 30 wt. %, such as 0.1, 0.2, 0.5, 1, 2, 5, 10, 15, 20, 25, or 30 wt %, based on the total weight of the first mixture. As described herein, the first mixture can further include any one or more additives. In general, the first drying step suitably does not include a reaction or curing process. Drying can remove the water medium and any other solvents therein, and the remaining material from the original mixture can form the first layer (e.g., as a dried film or coating on the substrate). The first layer can be applied using a rod or as a spray.

Drying the applied first layer removes the water and/or other solvents present. When the substrate is a cellulosic substrate or other substrate including hydrogen bonding groups such as hydroxyl and/or amino-groups, application of the first mixture can include the formation of hydrogen bonds between the substrate and the first layer material as a means for adhesion, such as when the first layer material also has hydroxyl and/or amino-groups (e.g., as in chitosan). Such adhesion is generally non-covalent and is reversible during recycling treatment, as described herein, of the coated substrate by aqueous extraction under appropriate conditions to remove and separate the omniphobic polymeric coating from the underlying substrate. In some embodiments, if a highly thick coating is desired, compression molding, or curtain coating for application of the first and/or second layers can be used.

In embodiments, when the first mixture includes an amino-functional polymer (e.g., chitosan) as first layer material, the amino-functional polymer (chitosan) and corresponding first layer optionally includes cationic ammonium groups (e.g., —$NH_3^+$ groups, for example as a result of acidification of pendant amino (—$NH_2$) groups of native amino-functional polymer or chitosan with an acid for dissolution in water and coating of the cellulosic or other porous substrates). The amino-functional polymer or chitosan can form a smooth outer coating surface, with the amino-functional polymer or chitosan penetrating and filling internal pores, which might be present in an underlying cellulosic or other porous substrate. The method can include neutralizing the amino-functional polymer (e.g., chitosan) coating, thereby converting at least some of the cationic ammonium groups to (non-ionic) amino groups (e.g., —$NH_2$ groups) and providing a neutralized amino-functional polymer (e.g., chitosan) coating as the first layer.

In embodiments, applying the second layer includes applying a second mixture to the substrate and drying the substrate, thereby removing the solvent and forming the second layer from the remaining material. The second mixture can include a solvent and material constituting the second layer therein, such as zein, gluten, AKD, or any other material described herein for the second layer. The material constituting the second layer can be dissolved in the solvent to form a solution, or provided as a non-dissolved dispersion in the solvent. The second mixture can include the second layer material at a concentration of 0.1 wt. % to 40 wt. %, for example, at least 0.1, 0.2, 0.5, 1, 2, 5, or 10 wt. % and/or up to 1, 2, 5, 10, 15, 20, 25, 30, or 40 wt. %, such as 0.1, 0.2, 0.5, 1, 2, 5, 10, 15, 20, 25, 30, 35, or 40 wt %, based on the total weight of the second mixture. Similar to the first layer, the second drying step suitably does not include a reaction or curing process. Drying removes the solvent medium, and the remaining material from the original mixture forms the second layer (e.g., as a dried film or coating on the first layer). Suitable solvents include, but are not limited to, ethanol, an ethanol-water mixture, methanol, a methanol-water mixture, and other alcohol or alcohol-water mixtures. Optionally, polar aprotic organic solvents can also be used as carriers for applying the second layer.

Applying the first mixture to the substrate and applying the second mixture to the first layer can include dip coating, spraying, using a drawdown bar (e.g., wire wound applicator), etc., and the methods for each mixture/layer can be the same or different. In embodiments, the first layer is applied using a rod. In embodiments, the first layer is applied as a spray. In embodiments, the second layer is applied using a rod. In embodiments, the second layer is applied as a spray.

In embodiments, drying the substrate includes exposing the coated substrate (i) to a temperature from 10° C. to 180° C. and (ii) for a time from 10 sec to 10 days. Drying (partially or fully) for each layer can be at the same or different conditions relative to each other. Drying can be performed at room temperature or by heating (e.g., in an oven, with exposure to a heat lamp, hot air, etc.), for example at a temperature from 80° C. or 100° C. to 140° C. or 180° C. and/or for a time from 10 sec, 20 sec, 30 sec, 1 min, 5 min, 10 min, 20 min, 30 min, 1 hr, 2 hr, or 4 hr and/or up to 1 hr, 2 hr, 4 hr, 6 hr, 12 hr, or 24 hr. In embodiments, drying the substrate includes exposing the coated substrate to a temperature of at least 10, 25, 40, 50, 60, 75, 90, or 100° C. and/or up to 180, 175, 170, 160, 150, 140, 130, 120, 110, 100, or 75° C., for example 10, 20, 30, 40, 50, 60, 70, 80, 90, 100, 110, 120, 130, 140, 150, 160, 170, or 180° C. In embodiments, drying the substrate includes exposing the coated substrate to a temperature described herein for a time of at least 10 s, 30 s, 1 min, 5 min, 10 min, 30 min, 45 min, 1 h, 3, h, 5 h, 7 h, 10 h, 12 h, 15 h and/or up to 17 h, 18 h, 20 h, 22 h, 1 day, 2 days 3 days, 4 days, or 5 days. Lower heating temperature or ambient temperature drying also possible, such as room temperature drying (e.g., 20° C. to 30° C.) for 30 min, 1 hr, 6 hr, 12 hr, 1 day, 2 day, or 5 day to 2 day, or 5 day, 10 day; or lower heating (e.g., 30° C. or 40° C. to 60° C.) for 2 hr, 6 hr, 12 hr, or 1 day to 2 day or 4 day; or 60° C. to 80° C. for 2 hr, 6 hr, or 12 hr to 1 day or 3 day.

Methods of Recycling Omniphobic Coated Articles

As provided herein, the disclosure further relates to methods for recycling an omniphobic coated article. The methods include providing an omniphobic coated articles described herein and extracting the omniphobic coated article in an aqueous extraction medium having a pH value sufficient to separate the omniphobic polymeric coating from the substrate.

As both the first and second layers are physically grafted or blended, the coating materials can be washed out from coated article, for example from paper pulp during re-pulping. For example, using acetic acid solutions (40% v/v) can be used to remove both zein and chitosan or other layers from the coated paper. Alternatively or additionally, a first rinse of pulp with acetic acid (e.g., 1 wt %) can be used to remove chitosan or other first layer, and a second rinse with an ethanol/water mixture to can be used to remove zein or other second layer. Alternatively or additionally, a first rinse of pulp with an ethanol/water mixture can be used to remove zein, then a second rinse with acetic acid (e.g., 1 wt %) can be used to remove chitosan. In the case of PVOH as the first layer and zein as the second layer, a first washing with an ethanol-water mixture, an then simply rinsing with water can result in complete removal of the coating material. Alternatively or additionally, during the repulping, if the pulp is not washed or extracted or partially washed/extracted, the remaining coating ingredient can become part of the recycled paper.

Extraction can remove substantially all of the omniphobic polymeric coating from the porous or other substrate, for example at least 95, 98, or 99 wt. % and/or up to 90, 95, 98, 99, or 100 wt. % of the omniphobic coating initially present on the omniphobic coated article. In embodiments, extraction removes at least 95, 96, 97, 98, 99, 99.5, 99.9, or 100 wt % of the omniphobic coating. Without intending to be bound by theory, there are two factors that can affect the extraction, in particular for a cellulosic/paper substrate. First, the coating should be exposed to water during a pulping process. During pulping, the hydrophobic second layer (e.g., zein) that was protecting the underlying hydrophilic coating (e.g., chitosan) and paper from water is no longer an effective barrier. Therefore, water can reach paper pulp through sides and where the hydrophobic coating is not present, allowing the hydrophilic coating to detach from the pulp. Secondly, low or high pH values can facilitate the hydrophilic coating solubility in water.

The recycling method can further include separating the substrate from the aqueous extraction medium and recovering and/or reforming the substrate. Separating the substrate from the aqueous extraction medium can be performed by any suitable solid/liquid separation process, for example filtration or decantation to retain the porous substrate (fiber/pulp etc.) and remove the aqueous extraction medium with the first and second layer components therein. Optionally, the separation can be followed by one or more washing steps to remove any residual omniphobic coating material remaining in and/or on the porous substrate. If the omniphobic coated article is pulped, ground, or otherwise size-reduced prior to extraction, the resulting porous substrate fragments can be recovered after separation from the aqueous extraction medium and then re-formed into a new, recycled porous substrate, for example recycled paper or other cellulosic substrate. In embodiments, the recovered or reformed porous substrate is substantially free from the omniphobic coating, for example having 5 wt. % or less coating material remaining relative to the initial coating material prior to extraction. For example, the recovered or reformed substrate can have at least 0.01, 0.1, 0.5, 1, or 2 wt. % and/or up to 1, 2, or 5 wt. % less coating material, relative to the initial coating material prior to extraction. Alternatively or additionally, the recovered or reformed porous substrate can have 0.1 wt. % or less coating material relative to the porous substrate. For example, the recovered or reformed substrate can have at least 0.0001, 0.001, or 0.01 wt. % and/or up to 0.001, 0.01, or 0.1 wt. % less coating material, relative to the substrate. Recycled pulp (without washing) can be used to make recycled paper, and the end paper can be recoated with a fresh or recycled omniphobic coating, as described herein, to make the recycled substrate again omniphobic.

In embodiments, the aqueous extraction medium for the recycling method has a pH value of up to 6 or greater than 8. In embodiments, extraction is performed in an acidic medium, for example having a pH value of at least 1, 2, 3, or 4 and/or up to 3, 4, 5, or 6, such as about 4-5 or 4-6. In embodiments, extraction is performed in a basic medium, for example having a pH value of at least 8, 9, 10, 11, or 12 and/or up to 11, 12, 13, or 14, such as about 8-12, 8-11, or 10-12. The pH value of the extraction medium can represent the initial pH value of the medium, which can change during extraction as various species are extracted from the coated article. The extraction medium generally includes water and one or more acid, base, and/or buffer components to maintain the desired pH value. In some embodiments, the extraction medium can include a light volatile alcohol (e.g., ethanol or methanol) as an alternative or supplement to water. In embodiments, the aqueous extraction medium includes acetic acid, water, ethanol, or a combination thereof.

The recycling method can further include performing a size reduction process on the omniphobic coated article prior to extracting the omniphobic coated article in the aqueous extraction medium. Size reduction can included pulping, grinding, or any other type of destructive mechanical process to fragment the coated article into smaller fragments, in particular to increase surface area exposure at interfacial regions between the substrate and the omniphobic coating, thereby enhancing contact between the aqueous extraction medium and hydrophilic portions of the omniphobic coating. In general, smaller fragment sizes can promote extraction efficiency.

It is to be understood that while the disclosure is read in conjunction with the detailed description thereof, the foregoing description and the following examples are intended to illustrate and not limit the scope of the disclosure, which is defined by the scope of the appended claims. Other aspects, advantages, and modifications are within the scope of the following claims.

EXAMPLES

The following examples illustrate the disclosed compositions and methods, but are not intended to limit the scope of any claims thereto. In the following examples, omniphobic compositions generally according to the disclosure are prepared and applied as a film or coating on a porous substrate such as paper. The applied films or coatings can then be evaluated according to a variety of tests as described below in order to characterize their relative degree of omniphobicity.

Methodology

Figure 1:
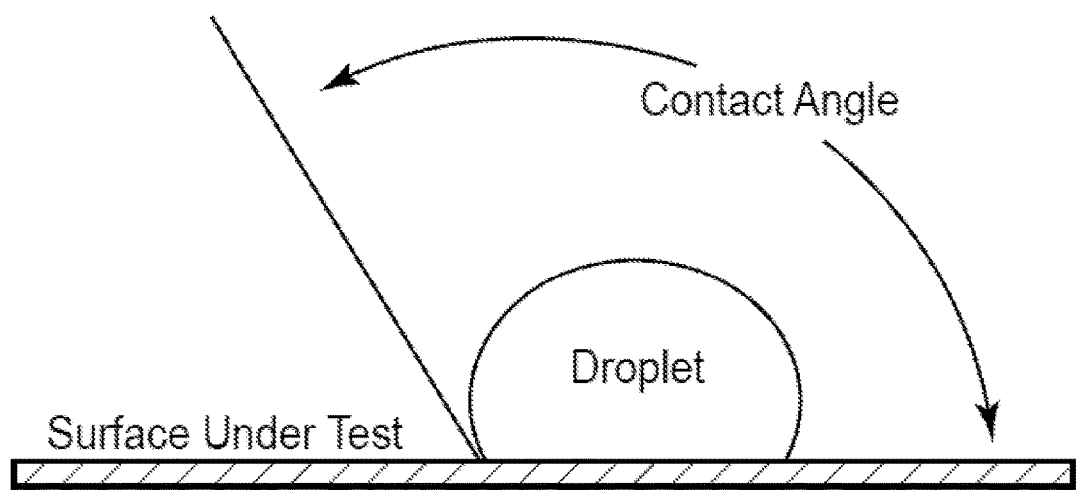
FIG. 1 is a diagram illustrating measurement of a contact angle for a liquid droplet on a surface.
Figure 2:
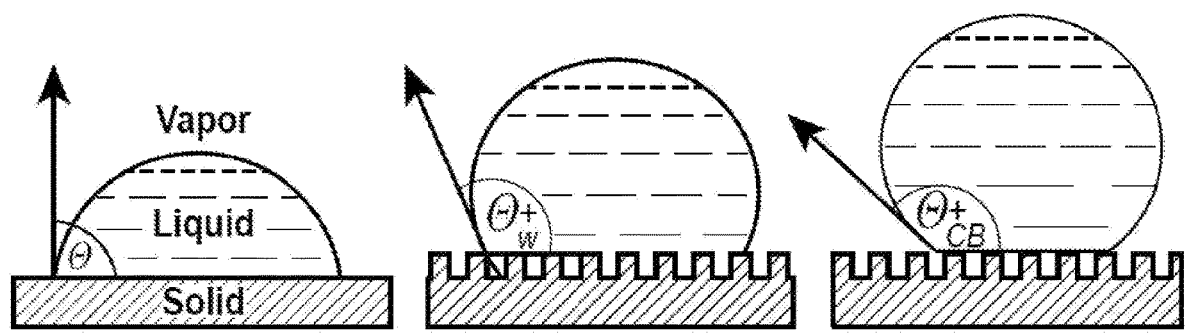
FIG. 2 is a diagram illustrating how contact angles for a given liquid droplet on a surface can vary as a function of surface topology (e.g., flat or smooth surface vs. textured surfaces).

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 10° to 65° (e.g., at least 10°, 20°, or 30° and/or up to 40°, 50°, 60°, or 65°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Oil Resistance: The TAPPI T 559 pm-96 standard method was used to study the oil-resistance of a coated substrate such as paper. All measurements were performed in triplicates and the oil-resistance was denoted in the form of a kit rating on a scale ranging from 1 to 12. A higher kit rating corresponds to higher grease/oil resistance and vice versa. A kit rating of 12 indicates the maximum oil repellency.

Cobb Rating/Water Resistance: Resistance to water absorption was recorded and measured via TAPPI standard T441 om-09 protocol and denoted as the Cobb value. 100 mL deionized water was kept in contact for 60 s with a 100 cm$^2$ section on the surface of a paper specimen using a Cobb sizing test. A "Cobb60" value indicating the total weight of water absorbed by a paper specimen after the 60 s contact time was determined by the weight difference before and after the test. The obtained Cobb60 values were obtained by the difference between the weight and then multiplied by 100 to express the result in grams per square meter (g/m$^2$) based on the 100 cm$^2$ test area.

Example 1

Five articles including an omniphobic coating on a paper substrate were prepared. The first layer of the omniphobic coating included chitosan, and the second layer of the omniphobic coating included zein.

Solutions comprising 2 wt % chitosan were prepared and applied on a paper substrate using a rod. The chitosan solutions in the various examples herein were provided in water further including about 1-2 wt. % acetic acid as the solvent medium. After allowing the chitosan layer to dry in open air for several hours, solutions comprising zein in various concentrations (as shown in Table 1) were applied to each article using a rod. The zein solutions in the various examples herein were provided in a water:ethanol mixture of about 20:80 (w/w) as the solvent medium. The samples were dried at room temperature for several hours, or alternatively, at high temperature for a shorter time, and evaluated. The results are shown in Table 1. Cobb values and Kit Ratings were determined by TAPPI Standard Method T441 om-09 and TAPPI Standard Method T 599 pm-96, respectively.

TABLE 1

Chitosan and Zein Coated Articles
Substrate: Paper
First Layer: Chitosan
Second Layer: Zein

| Sample | Chitosan concentration (wt %) | Zein concentration (wt %) | Method of coating | Cobb60 Value (g/m$^2$) | Kit Rating (max = 12) |
|---|---|---|---|---|---|
| 1 | 2 | 10 | Chitosan: rod Zein: rod | 16.2 | 12 |
| 2 | 2 | 5 | Chitosan: rod Zein: rod | 18.1 | 11.3 |
| 3 | 2 | 5 | Chitosan: rod Zein: rod | 18.0 | 11.3 |
| 4 | 2 | 2 | Chitosan: rod Zein: rod | 26.6 | 12 |
| 5 | 2 | 2 | Chitosan: rod Zein: rod | 24.8 | 12 |

As shown in Table 1, the cobb value (i.e., the water absorptiveness) of the articles increased as the amount of zein in the second layer decreased. In contrast, the kit rating (i.e., the grease or oil resistance) remained relatively consistent for each article, regardless of the amount of zein in the second coating.

Example 2

The effect of the method of application of the second layer (e.g., zein) was evaluated.

An article including an omniphobic coating on a paper substrate was prepared. The first layer of the omniphobic coating included chitosan, and the second layer of the omniphobic coating included zein.

A solution comprising 2 wt % chitosan was prepared and applied on a paper substrate using a rod. After allowing the chitosan layer to dry in open air for several hours, a solution comprising zein in a concentration of 10 wt % was applied to the article using a spray method. The sample was dried at room temperature for several hours, or alternatively, at high temperature for a shorter time, and evaluated. The results are shown in Table 2.

TABLE 2

Chitosan and Zein Coated Articles (Zein Applied via Spray)
Substrate: Paper
First Layer: Chitosan
Second Layer: Zein

| Sample | Chitosan concentration (wt %) | Zein concentration (wt %) | Method of coating | Cobb60 Value (g/m$^2$) | Kit Rating (max = 12) |
|---|---|---|---|---|---|
| 6 | 2 | 10 | Chitosan: rod Zein: spray | 10.7 | 12 |

As shown in Table 2, the cobb value the article decreased (as compared to sample 1 in Table 1, above), when the zein was added via a spray method. The kit rating was unaffected.

Example 3

The effect of using starch as the first layer was evaluated.

Two articles including an omniphobic coating on a paper substrate were prepared. The first layer of the omniphobic coating included starch, and the second layer of the omniphobic coating included zein.

Solutions comprising various concentrations of starch (as shown in Table 3) were prepared and applied on a paper substrate using a rod. After allowing the starch layer to dry in open air for several hours, solutions comprising 10 wt % zein were applied to each article using a rod. The samples were dried at room temperature for several hours, or alternatively, at high temperature for a shorter time, and evaluated. The results are shown in Table 3.

TABLE 3

Starch and Zein Coated Articles
Substrate: Paper
First Layer: Starch
Second Layer: Zein

| Sample | Starch concentration (wt %) | Zein concentration (wt %) | Method of coating | Cobb60 Value (g/m$^2$) | Kit Rating (max = 12) |
|---|---|---|---|---|---|
| 7 | 5 | 10 | Starch: rod Zein: rod | 9.0 | 8.0 |
| 8 | 10 | 10 | Starch: rod Zein: rod | 9.3 | 8.0 |

As shown in Table 3, the cobb values of the articles decreased when chitosan was replaced by starch in the first layer. However, the kit rating also decreased, despite the amount of zein remaining constant (e.g., as compared to samples 1 and 6, above).

Example 4

The effect of using polyvinyl alcohol (PVOH) as the first layer was evaluated.

Two articles including an omniphobic coating on a paper substrate were prepared. The first layer of the omniphobic coating included polyvinyl alcohol, and the second layer of the omniphobic coating included zein.

Solutions comprising 5 wt % of PVOH were prepared and applied on a paper substrate using a rod. After allowing the PVOH layer to dry in open air for several hours, solutions comprising various concentrations of zein (as shown in Table 4) were applied to each article using a rod. The samples were dried at room temperature for several hours, or alternatively, at high temperature for a shorter time, and evaluated. The results are shown in Table 4.

TABLE 4

Polyvinyl Alcohol and Zein Coated Articles
Substrate: Paper
First Layer: Polyvinyl Alcohol
Second Layer: Zein

| Sample | PVOH concentration (wt %) | Zein concentration (wt %) | Method of coating | Cobb60 Value (g/m$^2$) | Kit Rating (max = 12) |
|---|---|---|---|---|---|
| 9 | 5 | 10 | PVOH: rod Zein: rod | 7.2 | 11.0 |
| 10 | 5 | 5 | PVOH: rod Zein: rod | 15.5 | 11.0 |

As shown in Table 4, the cobb values of the articles decreased when chitosan was replaced by PVOH in the first layer. The kit rating was relatively consistent, even when the amount of zein in the second layer was reduced by 50%.

Example 5

The effects of various different second layers were evaluated.

Four articles including an omniphobic coating on a paper substrate were prepared. The first article was a control comprising only a single layer of gluten, applied using a rod, on a paper substrate. The remaining articles included an omniphobic coating where the first layer of omniphobic coating included chitosan, and the second layer of the omniphobic coating included one of gluten, alkyl ketene dimer (AKD), and latex.

Solutions comprising 2 wt % chitosan were prepared and applied on a paper substrate using a rod. After allowing the chitosan layer to dry in open air for several hours, solutions comprising gluten (in water with 0.08 wt. % sodium sulfite as catalyst), AKD, or latex were applied to each article using a rod or as a spray (as shown in Table 5). The samples were dried at room temperature for several hours, or alternatively, at high temperature for a shorter time, and evaluated. The results are shown in Table 5.

TABLE 5

Chitosan Coated Articles with Various Second Layers
Substrate: Paper
First Layer: Chitosan
Second Layer: Various

| Sample | Chitosan concentration (wt %) | Second Layer Material (wt. %) | Method of coating | Cobb60 Value (g/m$^2$) | Kit Rating (max = 12) |
|---|---|---|---|---|---|
| Control | — | Gluten/10 wt. % | Gluten: rod | 64.5 | 0 |
| 11 | 2 | Gluten/10 wt. % | Chitosan: rod Gluten: rod | 36.7 | 11 |
| 12 | 2 | AKD/commercial solution | Chitosan: rod AKD: spray | 67.8 | 12 |
| 13 | 2 | Latex/commercial solution | Chitosan: rod Latex: spray | 6.3 | 12 |

As shown in Table 5, the cobb values of the articles increased when the second layer included gluten and AKD. In contrast the cobb value significantly decreased when the second layer included latex. The kit rating was relatively consistent for each of the tested second layer materials when the first layer was also present. The control sample without the first layer and only gluten as the second layer shows that the coated article is not substantially grease or oil resistant, having a kit value of zero.

Example 6

The effect of a delay in applying the second layer to a PVOH-coated article was evaluated using various concentrations of zein. Each of the layers were applied using a spray method.

Six articles including an omniphobic coating on a paper substrate were prepared. The articles included an omniphobic coating where the first layer of omniphobic coating included PVOH, and the second layer of the omniphobic coating included zein at various concentrations.

Solutions comprising 5 wt % PVOH were prepared and applied on a paper substrate using a spray method. After allowing the PVOH layer to dry in open air for the amount of time indicated in Table 6, solutions comprising zein in various concentrations (as shown in Table 6) were applied to the articles as a spray. Each layer was applied while keeping the paper substrate horizontal. The samples were dried at room temperature for several hours, or alternatively, at high temperature for a shorter time, and evaluated. The results are shown in Table 6.

TABLE 6

PVOH and Zein Coated Articles (Each Applied via Spray)
Substrate: Paper
First Layer: PVOH
Second Layer: Zein

| Sample | PVOH concentration (wt %) | Zein concentration (wt %) | Time Between Application | Cobb60 Value (g/m$^2$) | Kit Rating (max = 12) |
|---|---|---|---|---|---|
| 14 | 5 | 5 | 4 h | 19.5 | 8.0 |
| 15 | 5 | 10 | 4 h | 9.7 | 12 |
| 16 | 5 | 20 | 4 h | 6.7 | 12 |
| 17 | 5 | 5 | 18 h | 13.8 | 12 |
| 18 | 5 | 10 | 18 h | 4.5 | 12 |
| 19 | 5 | 20 | 18 h | 5.0 | 12 |

As shown in Table 6, the greater the time between application of the first and second layer, when each was applied via a spray method, generally resulted in lower cobb values. Lower cobb values were also achieved when the concentration of zein in the second layer was increased.

Example 7

The effect of a delay in applying the second layer to a PVOH-coated article was evaluated using various concentrations of zein. The PVOH layer was applied using a rod and the zein layer was applied using a spray method.

Six articles including an omniphobic coating on a paper substrate were prepared. The articles included an omniphobic coating where the first layer of omniphobic coating included PVOH, and the second layer of the omniphobic coating included zein at various concentrations.

Solutions comprising 5 wt % PVOH were prepared and applied on a paper substrate using a rod. After allowing the PVOH layer to dry in open air for the amount of time indicated in Table 7, solutions comprising zein in various concentrations (as shown in Table 7) were applied to the articles as a spray. The zein was applied while keeping the paper substrate horizontal. The samples were dried at room temperature for several hours, or alternatively, at high temperature for a shorter time, and evaluated. The results are shown in Table 7.

TABLE 7

PVOH and Zein Coated Articles (Zein Applied via Spray)
Substrate: Paper
First Layer: PVOH
Second Layer: Zein

| Sample | PVOH concentration (wt %) | Zein concentration (wt %) | Time Between Application | Cobb60 Value (g/m$^2$) | Kit Rating (max = 12) |
|---|---|---|---|---|---|
| 20 | 5 | 5 | 4 h | 12.4 | 12 |
| 21 | 5 | 10 | 4 h | 6.4 | 12 |
| 22 | 5 | 20 | 4 h | 6.8 | 12 |
| 23 | 5 | 5 | 18 h | 15.1 | 12 |
| 24 | 5 | 10 | 18 h | 7.0 | 12 |
| 25 | 5 | 20 | 18 h | 4.6 | 12 |

As shown in Table 7, the greater the time between application of the first and second layer, when only the second layer (zein) was applied via a spray method, generally resulted in lower cobb values. Lower cobb values were also achieved when the concentration of zein in the second layer was increased.

Example 8

The effect of an 18-hr (overnight) delay in applying the second layer to a PVOH-coated article was evaluated using various concentrations of zein. Each layer was applied using a rod.

Six articles including an omniphobic coating on a paper substrate were prepared. The articles included an omniphobic coating where the first layer of omniphobic coating included PVOH, and the second layer of the omniphobic coating included zein at various concentrations.

Solutions comprising 5 wt % PVOH were prepared and applied on a paper substrate using a rod. After allowing the PVOH layer to dry in open air for 18 h (e.g., overnight), solutions comprising zein in various concentrations (as shown in Table 8) were applied to the articles using a rod. The samples were dried at room temperature for several hours, or alternatively, at high temperature for a shorter time, and evaluated. The results are shown in Table 8.

TABLE 8

PVOH and Zein Coated Articles (Each Applied via a Rod)
Substrate: Paper
First Layer: PVOH
Second Layer: Zein

| Sample | PVOH concentration (wt %) | Zein concentration (wt %) | Time Between Application | Cobb60 Value (g/m$^2$) | Kit Rating (max = 12) |
|---|---|---|---|---|---|
| 26 | 5 | 2 | 18 h | 28.1 | 9.3 |
| 27 | 5 | 5 | 18 h | 11.5 | 12 |
| 28 | 5 | 10 | 18 h | 6.6 | 12 |
| 29 | 5 | 20 | 18 h | 5.5 | 12 |
| 30 | 5 | 30 | 18 h | 3.1 | 12 |
| 31 | 5 | 40 | 18 h | 1.8 | 12 |

As shown in Table 8, the cobb value was indirectly related to the amount of zein in the second layer. For all but sample 26, the kit rating was not impacted by the zein concentration.

Example 9

The recyclability of coated paper substrates according to the disclosure was evaluated at different stages of recycling using IR analysis. Paper substrate samples coated with chitosan and zein as the first and second coating layers, respectively, were washed with DI water, ethanol, 2 wt. % acetic acid in water, and 2 wt. % acetic acid in ethanol. After washing during the repulping process, the chitosan and zein coating materials were removed from the paper substrate, and the corresponding pulp could be recovered (e.g., for forming recycled paper).

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. An omniphobic coated article, comprising:
    a porous substrate;
    an omniphobic coating adjacent to the porous substrate, the omniphobic coating comprising:
        an oleophobic and hydrophilic first layer adjacent to the porous substrate, wherein the first layer comprises chitosan, and
        a hydrophobic and optionally oleophilic second layer adjacent to the first layer at a position further from the porous substrate than the first layer, wherein the second layer comprises zein.

2. The article of claim 1, wherein the zein is present in the omniphobic coating in an amount in range from 2 wt. % to 10 wt. % relative to the porous substrate.

3. The article of claim 1, wherein the first layer and the second layer are free from omniphobic polymers.

4. The article of claim 1, wherein materials forming the first layer and materials forming the second layer would form an incompatible mixture if blended together.

5. The article of claim 1, wherein the porous substrate comprises a porous cellulosic substrate.

6. The article of claim 5, wherein the cellulosic substrate is selected from the group of paper, corrugated board, cardboard, wood, and fabric.

7. The article of claim 5, wherein the cellulosic substrate is in the form of a food-service article selected from the group consisting of a drinking cup, a food plate, a food container, and a food wrapper.

8. The article of claim 5, wherein the cellulosic substrate is in the form of a packaging box.

9. The article of claim 1, wherein the porous substrate comprises a hydrophobic and optionally oleophilic third layer adjacent to the first layer at a position further from the second layer than the first layer.

10. The article of claim 9, wherein the article is in the form of a free-standing film.

11. The article of claim 1, wherein the omniphobic coating comprises a fourth layer between the first layer and the second layer.

12. The article of claim 1, wherein the porous substrate has opposing first and second surfaces; and
    the omniphobic coating comprises a first omniphobic coating adjacent to the first porous substrate surface and a second omniphobic coating adjacent to the second porous substrate surface.

13. The article of claim 1, wherein the omniphobic coating further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

14. The article of claim 1, wherein the omniphobic coated article has a kit rating of 8 to 12, as determined by TAPPI Standard Method T 599 pm-96.

15. The article of claim 1, wherein the omniphobic coated article has a cobb value in range from 0.1 to 20 g/m², as determined by TAPPI standard T441 om-09 protocol.

16. The article of claim 1, wherein the omniphobic coating has a thickness ranging from 0.01 μm to 3000 μm.

17. The article of claim 1, wherein the omniphobic coated article has a relative permeability for water vapor of 0.5 or less, relative to a corresponding porous substrate without the omniphobic coating thereon.

18. The article of claim 1, wherein the omniphobic coated article has a relative uptake for liquid water of 0.5 or less, relative to a corresponding porous substrate without the omniphobic coating thereon.

19. The article of claim 1, wherein the omniphobic coated article has a relative permeability for non-water gases of 0.5 or less, relative to a corresponding porous substrate without the omniphobic coating thereon.

20. The article of claim 1, wherein the first layer is present in the omniphobic coating in an amount in range from 0.1 wt. % to 20 wt. % relative to the porous substrate.

21. The article of claim 1, wherein the second layer is present in the omniphobic coating in an amount in range from 0.1 wt. % to 40 wt. % relative to the porous substrate.

22. The article of claim 1, wherein:
the porous substrate comprises a porous cellulosic substrate;
the omniphobic coated article has a kit rating of 8 to 12, as determined by TAPPI Standard Method T 599 pm-96; and
the omniphobic coated article has a cobb value in range from 0.1 to 20 g/m², as determined by TAPPI standard T441 om-09 protocol.

23. A method for recycling an omniphobic coated article, the method comprising:
providing an omniphobic coated article according to claim 1; and
extracting the omniphobic coated article in an aqueous extraction medium having a pH value sufficient to separate the omniphobic polymeric coating from the porous substrate.

24. The method of claim 23, further comprising:
separating the porous substrate from the aqueous extraction medium; and
recovering or reforming the porous substrate.

25. The method of claim 23, wherein the aqueous extraction medium has a pH value of up to 6 or greater than 8.

26. The method of claim 23, further comprising:
performing a size reduction process on the omniphobic coated article prior to extracting the omniphobic coated article in the aqueous extraction medium.

27. A method for forming an omniphobic coated article, the method comprising:
providing a porous substrate; and
applying an oleophobic and hydrophilic first layer over the porous substrate, wherein the first layer comprises chitosan; and
applying a hydrophobic and optionally oleophilic second layer over the first layer, wherein the second layer comprises zein;
wherein the first layer and the second layer collectively form an omniphobic coating adjacent to the porous substrate.

28. The method of claim 27, wherein applying the first layer comprises:
applying a first mixture to the porous substrate, the first mixture comprising water and material constituting the first layer therein; and
at least partially drying the porous substrate, thereby removing the water partially or fully and forming the first layer from the remaining material.

29. The method of claim 27, wherein applying the second layer comprises:
applying a second mixture to the porous substrate, the second mixture comprising a solvent and material constituting the second layer therein; and
drying the porous substrate, thereby removing the solvent and forming the second layer from the remaining material.

30. The method of claim 28, wherein drying the porous substrate comprises: exposing the coated porous substrate (i) to a temperature from 10° C. to 180° C. and (ii) for a time from 10 sec to 10 days.

* * * * *